(12) United States Patent
Oshima et al.

(10) Patent No.: US 6,705,677 B2
(45) Date of Patent: Mar. 16, 2004

(54) CHAIR WITH SEATBACK AND ROTATING DAMPER DEVICE

(75) Inventors: Kazuyoshi Oshima, Naruto-machi (JP); Hiroyuki Masuda, Hikata-machi (JP)

(73) Assignee: Sugatsun Kogyo Co., LTD, Tokyo (JP)

( * ) Notice: Subject to any disclaimer, the term of this patent is extended or adjusted under 35 U.S.C. 154(b) by 0 days.

(21) Appl. No.: 09/959,066

(22) PCT Filed: Feb. 13, 2001

(86) PCT No.: PCT/JP01/00987

§ 371 (c)(1),
(2), (4) Date: Oct. 16, 2001

(87) PCT Pub. No.: WO01/60207

PCT Pub. Date: Aug. 23, 2001

(65) Prior Publication Data

US 2002/0158495 A1 Oct. 31, 2002

(30) Foreign Application Priority Data

| Feb. 18, 2000 | (JP) | ......... 2000-041202 |
| Mar. 10, 2000 | (JP) | ......... 2000-066365 |
| Jun. 12, 2000 | (JP) | ......... 2000-174974 |
| Jun. 12, 2000 | (JP) | ......... 2000-174975 |

(51) Int. Cl.⁷ ............................................. A47C 1/032
(52) U.S. Cl. ............................... 297/300.2; 297/300.4; 297/342; 297/322; 297/316
(58) Field of Search ......................... 297/300.2, 300.4, 297/300.5, 337, 342, 322, 316

(56) References Cited

U.S. PATENT DOCUMENTS

| 4,668,012 A | * | 5/1987 | Locher ................. 297/300.3 |
| 4,709,962 A | * | 12/1987 | Steinmann ............ 297/300.3 |
| 4,790,600 A | * | 12/1988 | Behringer .............. 297/337 |
| 4,966,411 A | * | 10/1990 | Katagiri et al. ........ 297/300.7 |
| 5,249,839 A | * | 10/1993 | Faiks et al. ............ 297/300.1 |
| 5,308,144 A | * | 5/1994 | Korn .................... 297/300.2 |
| 5,314,237 A | * | 5/1994 | Koepke et al. ........ 297/318 |
| 5,397,165 A | * | 3/1995 | Grin et al. ............. 297/300.5 |
| 5,810,439 A | * | 9/1998 | Roslund, Jr. .......... 297/300.4 |

FOREIGN PATENT DOCUMENTS

| JP | 51-91105 | | 7/1976 |
| JP | 4-29633 | A | 1/1992 |
| JP | 6-38849 | A | 2/1994 |
| JP | 06-253940 | A | 9/1994 |
| JP | 07-10341 | | 2/1995 |
| JP | 3040273 | U | 5/1997 |
| JP | 9-206156 | A | 8/1997 |
| JP | 10-169688 | A | 6/1998 |
| JP | 10-267064 | A | 10/1998 |

* cited by examiner

Primary Examiner—Peter M. Cuomo
Assistant Examiner—Joseph Edell
(74) Attorney, Agent, or Firm—Brown & Michaels, PC; Eugene Stephens & Associates

(57) ABSTRACT

A forward end part of an arm part (53) of a seatback frame is connected to a forward end part of a main frame (3) such that the forward end part of said arm part (53) can turn about a horizontal axis (61) extending leftward and rightward. A cam hole (71) is formed in a forward end part of the arm part (53). A shaft part (72) movably engageable with the cam hole (71) through a roller (73) is disposed at a forward end part of a seat frame (41). The cam hole (71), the shaft part (72) and the roller (73) constitute a positive motion mechanism (70) for causing a seat frame (41) to be tilted in accordance with the turning motion of the arm part (53).

10 Claims, 28 Drawing Sheets (A)

(B)

(C)

CHAIR WITH SEATBACK AND ROTATING DAMPER DEVICE

TECHNICAL FIELD

This invention relates to a chair having a seat and a seatback in which the seat and the seatback can be tilted between a working position and a relaxing position, and a rotary damper which is suited to be used for the chair and others.

BACKGROUND ART

A conventional chair with a seatback is disclosed in Japanese Patent Application Laid-Open No. H06-253940. This chair with a seatback comprises a main frame disposed at an upper end of a support leg, a seatback frame whose forward end is turnably disposed at the main frame, thereby enabling the seatback, which is disposed at an upper part of a rear end side, can be tilted between a working position and a relaxing position, and a seat frame at which the seat is disposed. A rear end part of the seat frame is turnably connected to the seatback frame. On the other hand, a forward end part of the seat frame is connected to the main frame through a positive motion cam mechanism. The positive motion cam mechanism comprises a cam hole formed in the main frame, and a shaft portion disposed at the seat frame and movably engaged with said cam hole. When the rear end part of the seat frame is moved upward and downward in accordance with the turning motion of the seatback frame, the positive motion mechanism causes the entire seat frame to move in forward and backward, upward and downward directions and tiled in an upward and downward direction in accordance with the turning motion of the seat frame in upward and downward directions.

The chair with a seatback further comprises bias means for biasing the seat frame and the seatback frame from the relaxing position side towards the working position side. The bias means biases the seat and the seatback in a working position when a person is not sitting on the seat, but it allows the seat and the seatback to be tilted in the relaxing position side when he leans against the seatback, depending on the load acting on the seatback.

The above-mentioned conventional chair with a seatback has the following various problems. First, since the cam hole of the positive motion cam mechanism is required not only to move the seat frame in a forward and backward direction but also to displace and tilt the seat frame in an upward and downward direction, the length of the cam hole must be long in an upward and downward direction. Accordingly, the main frame is also required to be increased in length in its upward and downward direction in accordance with the length of the cam hole in an upward and downward direction. For this reason, the chair with a seatback is difficult to be made small in size.

Second, if a comparatively large load acts on the seatback when a biasing force of the bias means for biasing the seat and the seatback from a relaxing position side to a working position side is small, the seat and the seatback are tilted from the working position towards the relaxing position at a high speed. As a result, the person sitting on the chair gets such an anxiety that the chair may be fallen down. If the biasing force of the bias means is increased, there occurs such an inconvenience that when, for example, the user of the chair changes his attitude in the relaxing position and as a result, the load acting on the seatback is reduced, the seat and the seatback is turned back to the working position side against the user's will.

Third, the seatback is supported on the main frame through a support arm but the conventional support arm is formed substantially as a rigid body. Accordingly, the seatback cannot be turned in a horizontal direction. For this reason, when the user turns backwards in a state in which he sits on the chair with a seatback, he cannot twist his body with his back kept contacted with the seatback and therefore, he must move his back forward from the seatback once.

DISCLOSURE OF INVENTION

The first form of the present invention is to solve the first problem and provides, therefore, a chair with a seatback comprising a main frame, a seat frame arranged at an upper part of the main frame, a seatback frame whose forward end part is connected to a forward end part of the main frame such that the forward end part can turn about a horizontal axis, thereby enabling a rear end part of the seatback frame to be tilted between a working position and a relaxing position, a displacement mechanism disposed between the rear end part of the seat frame and the seatback frame and adapted to displace the rear end part of the seat frame in an obliquely forward/backward direction in accordance with the turning motion of the seatback frame, and a positive motion cam mechanism for displacing the seat frame upward and downward, forward and backward and for tilting the seat frame upward and downward in corporation with the displacement mechanism, wherein the positive motion cam mechanism is disposed between the forward end part of the seat frame and the forward end part of the seatback frame.

In this case, it is preferred that the positive motion cam mechanism includes a cam hole and a shaft movably inserted in the cam hole in a longitudinal direction of the cam hole, one of the cam hole and the shaft is disposed at the seat frame and the other is disposed at the seatback frame. The cam hole is preferably disposed at the seatback frame.

It is preferred that the displacement mechanism includes a link connected at a lower end part thereof to the main frame such that the link can turn about a horizontal axis and at an upper end part thereof to a rear end part of the seat frame such that the link can turn about a horizontal axis, a second positive motion cam mechanism disposed between an upper end part of the link and the seatback frame and adapted to cause the link to turn in accordance with the turning motion of the seatback frame, and the second positive motion cam mechanism includes a second shaft movably inserted in the second cam holes disposed at one of the upper end part of the seatback frame and the second cam hole disposed at the other and movably inserted in the second cam hole.

It is preferred that the main frame is provided with an engagement member removably engaged with the link and adapted to positionally fixing the seatback frame to the working position by prohibiting the turning of the link at the time of engagement.

It is preferred that a lower end part of a shielding member is disposed at a forward end part of the main frame such that the shielding member can turn about a horizontal axis, the shielding member is adapted to shield a gap formed between a forward end part of the main frame and the seat frame or a seat cushion disposed at the seat frame, and an upper part of the shielding plate is connected to a forward end part of the seat frame such that when the gap varies in size in accordance with the displacement of the seat frame, the shielding plate is turned in accordance with the size of the gap.

A second form of the present invention is to solve the second problem and provides, therefore, a chair with a seatback comprising a seat capable of tilting between a working position and a relaxing position, a seatback capable of tilting in accordance with a tilting motion of the seat, and bias means for biasing the seat from the relaxing position side to the working position side, wherein the chair with a seatback further comprises a rotary damper (180) for restricting a high speed tilting of the seat at least in one direction between the working position and the relaxing position.

In this case, it is accepted that the rotary damper restricts a high speed tilting of the seat from the working position side to the relaxing position side but allows a high speed tilting of the seat from the relaxing position side to the working position side. It is also accepted that the rotary damper restricts a high speed tilting of the seat from the relaxing position side to the working position side but allows a high speed tilting of the seat from the working position side to the relaxing position side. However, it is preferred that the rotary damper restricts a high speed tilting of the seat in both directions between the working position and the relaxing position.

It is preferred that the rotary damper can be switched from one to another among a first state in which the rotary damper restricts a high speed tilting of the seat from the working position side to the relaxing position side but allows a high speed tilting of the seat from the relaxing position side to the working position side, a second state in which the rotary damper restricts a high speed tilting of the seat from the relaxing position side to the working position side but allows a high speed tilting of the seat from the working position side to the relaxing position side, and a third state in which the rotary damper restricts a high speed tilting of the seat in both directions between the working position and the relaxing position.

A third form of the present invention is to provided a rotary damper which is suited to be used in the chair with a seatback according to the second form or others, comprising an apparatus main body having a receiving hole, and a rotor relatively rotatably inserted in the receiving hole, the apparatus main body and the rotor are provided with partition wall parts for dividing an annular space, which is formed between an inner peripheral surface of the receiving hole and an outer peripheral surface of the rotor, in a circumferential direction and forming a plurality of pressure chambers, one of the partition wall parts including a pair of fixed wall parts which are disposed on either the inner peripheral surface of the receiving hole or the outer peripheral surface of the rotor such that the pair of fixed wall parts are located away from each other in a circumferential direction, and a movable wall part circumferentially movably disposed at a receiving space formed between the pair of fixed wall parts, a first communication path and a first flow-in path for communicating the receiving space with the pressure chamber adjacent to one of the fixed wall parts being formed between the receiving space and the pressure chamber, a second communication path and a second flow-in path for communicating the receiving space with the pressure chamber adjacent to the other fixed wall part being formed between the receiving space and the pressure chamber, when the movable wall part is in abutment with the one fixed wall part, the first flow-in path being closed but the second flow-in path being open, when the movable wall part is in abutment with the other fixed wall part, the first flow-in path being in open but the second flow-in path being closed, at least one of the first and second communication paths being provided with a resistor part for generating resistance against the flow of fluid.

In this case, the pair of fixed wall parts are preferably disposed at the apparatus main body.

It is preferred that the first communication path includes a first communication hole for communicating the pressure chamber facing the one fixed wall part with the receiving space, and the second communication path includes a second communication hole for communicating the fixed chamber facing the other fixed wall part with the receiving space.

It is preferred that the apparatus main body is movably provided with a first and a second adjustment member, which can be operated from outside thereof, such that the first and second adjustment members can be brought towards and away from opening parts facing the pressure chambers of the first and second communication holes, and a forward end part of at least one of the first and second adjustment members is brought towards the first and second communication holes, thereby forming the resistor part at least between the forward end part of the first adjustment member and an opening part of the first communication hole or between the forward end part of the second adjustment member and an opening part of the second communication hole.

Preferably, the first and second communication holes are formed in a row with axes thereof aligned with each other, and the first and second adjustment members are movably disposed in an axial direction of the first and second communication holes with axes of the first and second adjustment members aligned with axes of the first and second communication holes.

The first and second adjustment members are preferably threadingly engaged with the apparatus main body.

A fourth form of the present invention is to solve the third problem and provides, therefore, a chair with a seatback comprising a main frame, a seat supported by the main frame, and a seatback arranged at a location higher than a rear part of the seat and supported by the main frame through a support arm, wherein a pair of the support arms are disposed one at a left and the other at a right, and the pair of support arms are elastically deformable so that when a user twisted his body with his back pressed against the seatback, the seatback can turn in a horizontal direction following the twisting motion of the user's body.

In this case, it is preferred that the seat is tiltably supported by the main frame for tilting between a working position and a relaxing position through a tilting mechanism, a pair of return springs are disposed between the main frame and the seat and adapted to bias the seat from the relaxing position side to the working position side, and end parts of the pair of return springs for biasing the seat from the relaxing position side to the working position side serve also as the support arms.

It is preferred that the tilting mechanism includes two pairs of front and rear turning links whose lower end parts are supported by the main frame such that the lower end parts can turn about a horizontal axis extending leftward and rightward and whose upper end parts are connected to the seat such that the upper end parts can turn about a horizontal axis extending leftward and rightward, a coiled spring is used as the return spring, and a pair of the coiled springs are arranged in a row between the pair of front turning links.

The main frame is preferably provided with a rotary damper for restricting a high speed turning of at least one of the two pairs of turning links.

It is preferred that the main frame is provided with an adjusting mechanism for adjusting biasing force of the coiled springs in accordance with turning operation of the adjustment member, and an adjustment member for operating said adjustment mechanism is disposed at a front end part of the main frame and at a front part of a generally central area of the pair of front turning links.

BRIEF DESCRIPTION OF DRAWINGS

FIG. 9(A) is a plan view thereof and FIG. 9(B) is a sectional view taken on line B—B of FIG. 9(A).

FIG. 10(A) is a plan view thereof and FIG. 10(B) is a side view thereof.

FIG. 11(A) is a front view thereof and FIG. 11(B) is a side view thereof.

FIG. 12(A) is a plan view thereof, FIG. 12(B) is a side view thereof and FIG. 9(C) is a front view thereof.

BEST MODE FOR CARRYING OUT THE INVENTION

Preferred embodiments of the present invention will be described hereinafter with reference to the accompanying drawings.

Figure 1:
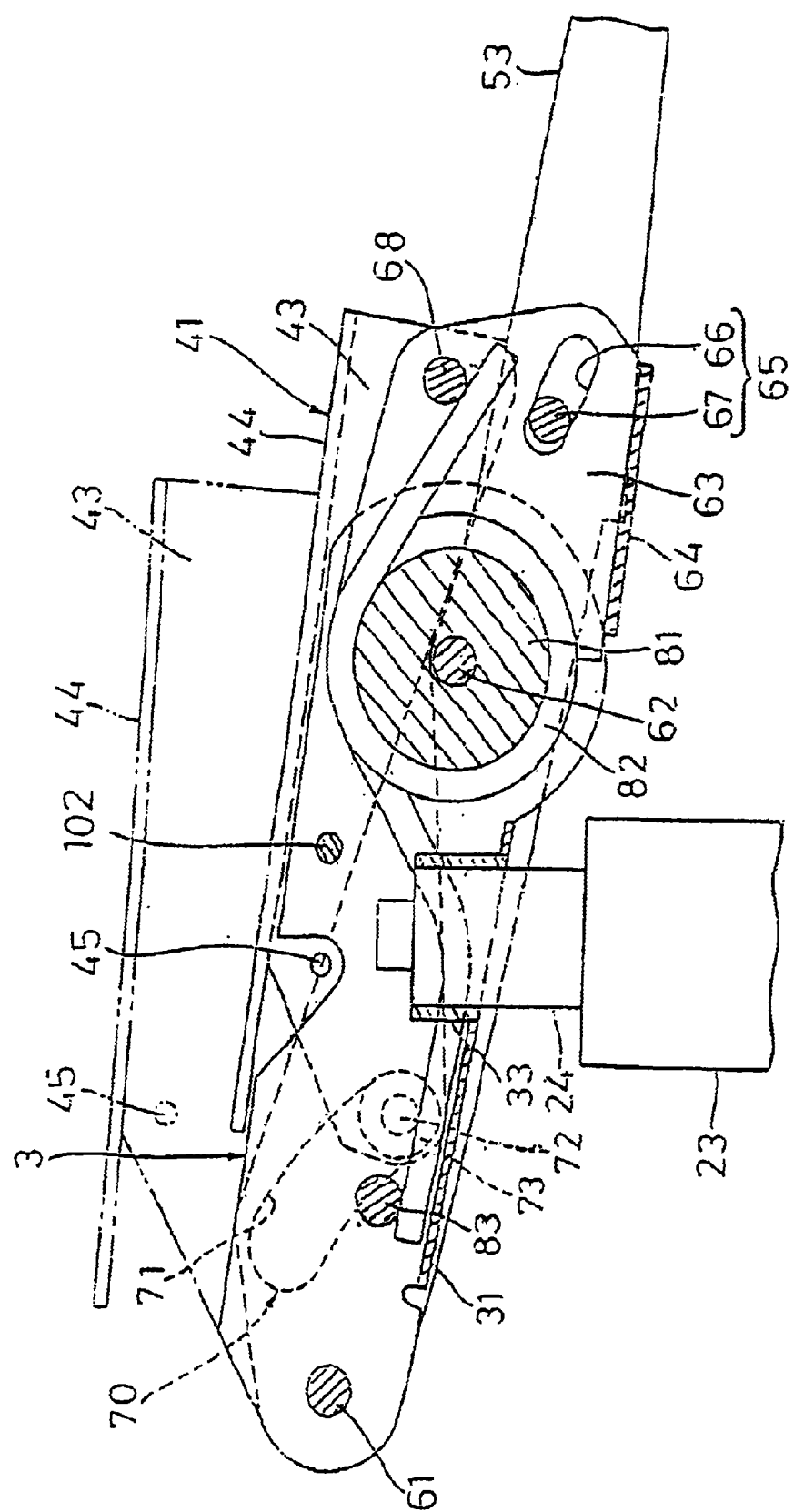
FIG. 1 is a partly omitted vertical sectional side view showing a first embodiment of a first form of the present invention, in which a seatback frame is turned to a working position.
Figure 2:
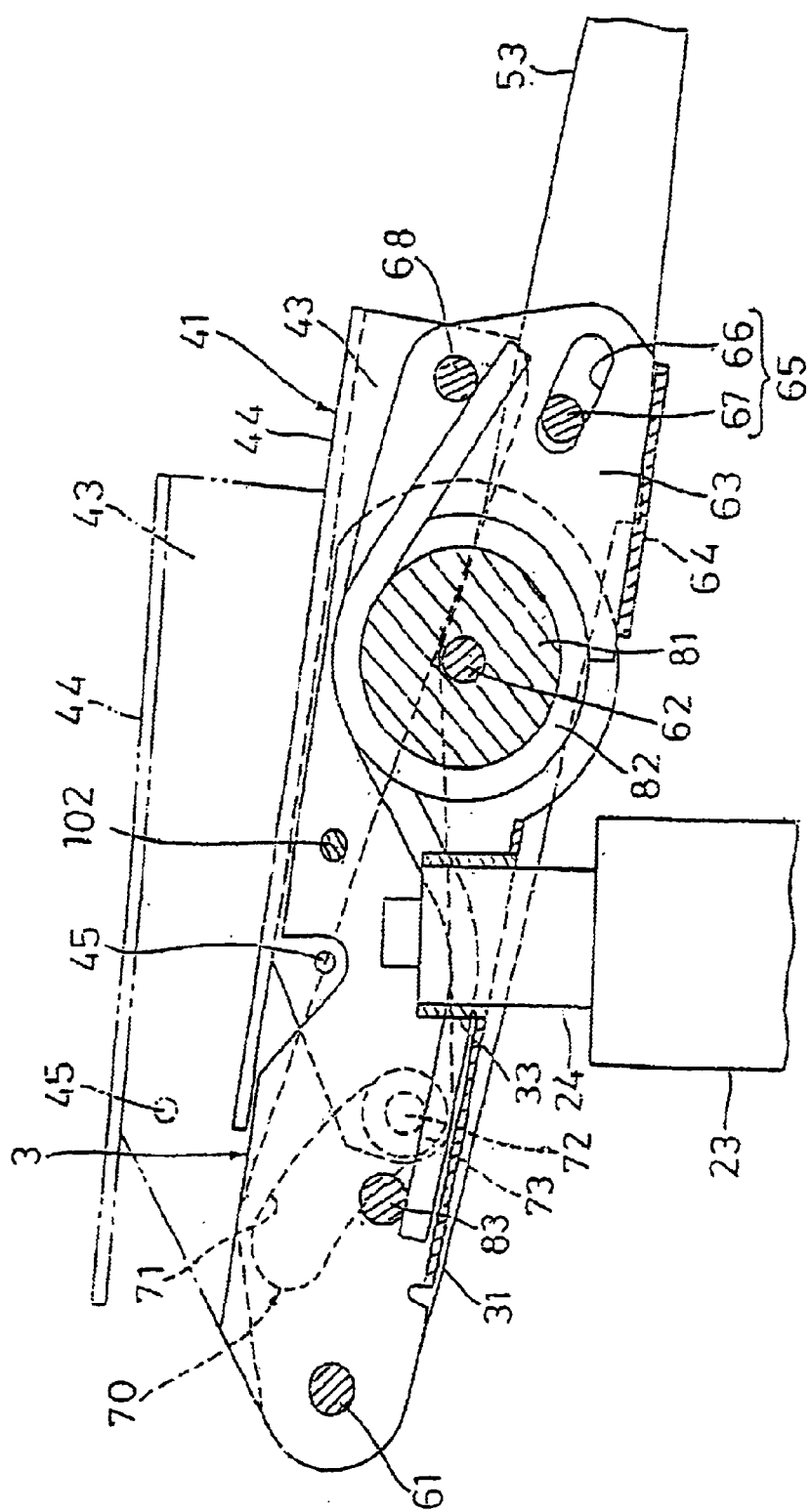
FIG. 2 is a sectional view, like FIG. 5, in which the seatback frame is turn to a relaxing position.
Figure 3:
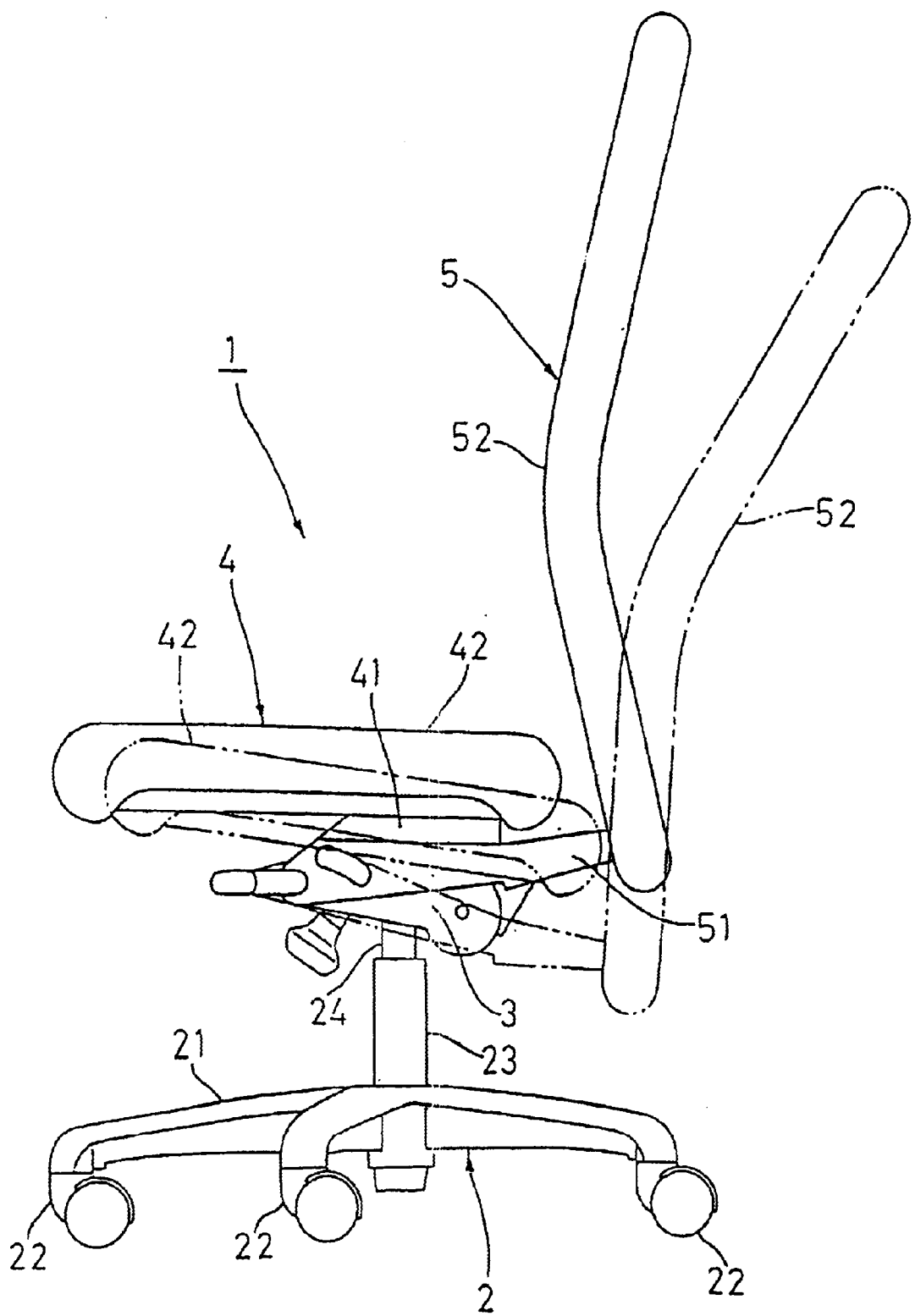
FIG. 3 is a side view showing the whole picture of the above embodiment.

FIGS. 1 to 12 show a first embodiment of a first form of the present invention. A chair 1 with a seatback according to this embodiment comprises, as shown in FIG. 3, a support portion 2, a main frame 3, a seat 4 and a seatback 5.

The support portion 2 includes a support frame 21. This support frame 21 is provided at a lower end part thereof with a plurality of casters 22 so that the chair 1 can travel on a floor. A support sleeve 23 is perpendicularly erected from a central part of the support frame 21. A lower end of the support leg 24 is turnably inserted into the support sleeve 23. This support leg 24 is positionally adjustable in an upward and downward direction with respect to the support sleeve 23 by an upward/downward moving mechanism (not shown) utilizing a gas pressure or the like. A main frame 3 is disposed at an upper end of the support leg 24. The main frame 3 is provided with the seat 4 and the backseat 5. Accordingly, the seat 4 and the seatback 5 are positionally adjustable in an upward and downward direction by positionally adjusting the support leg 24 in the upward/downward direction.

Figure 9:
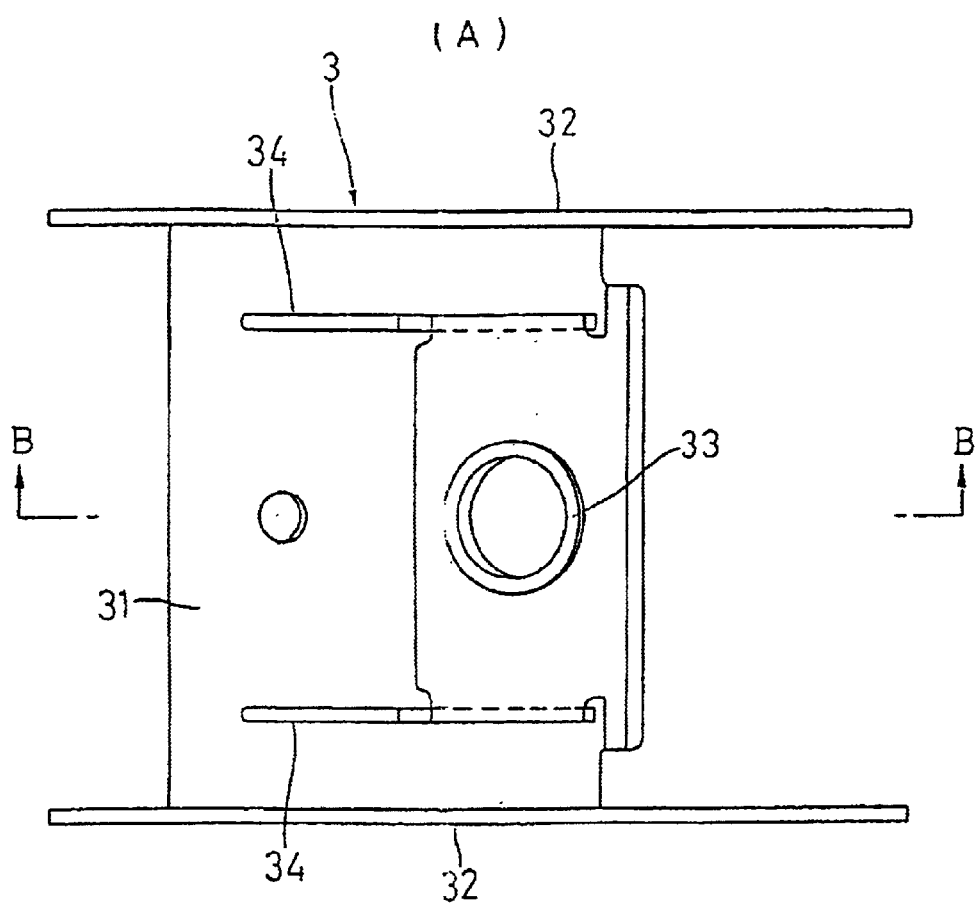
FIG. 9 is a view showing a main frame used in the above-mentioned embodiment.
Figure 9:
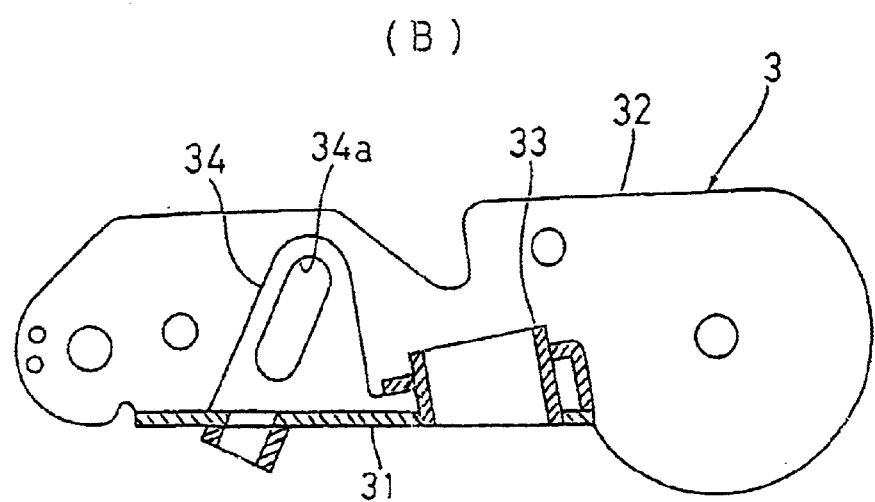

The main frame 3 includes, as shown in FIG. 9, a bottom plate portion 31, and side plate portions 32, 32 integrally erected upward from left and right opposite sides of the bottom plate portion 31. A connecting sleeve 33 is fixed to a rear end part of the bottom plate portion 31. An upper end part of the support leg 24 is fixedly engaged with the connecting sleeve 33.

Figure 4:
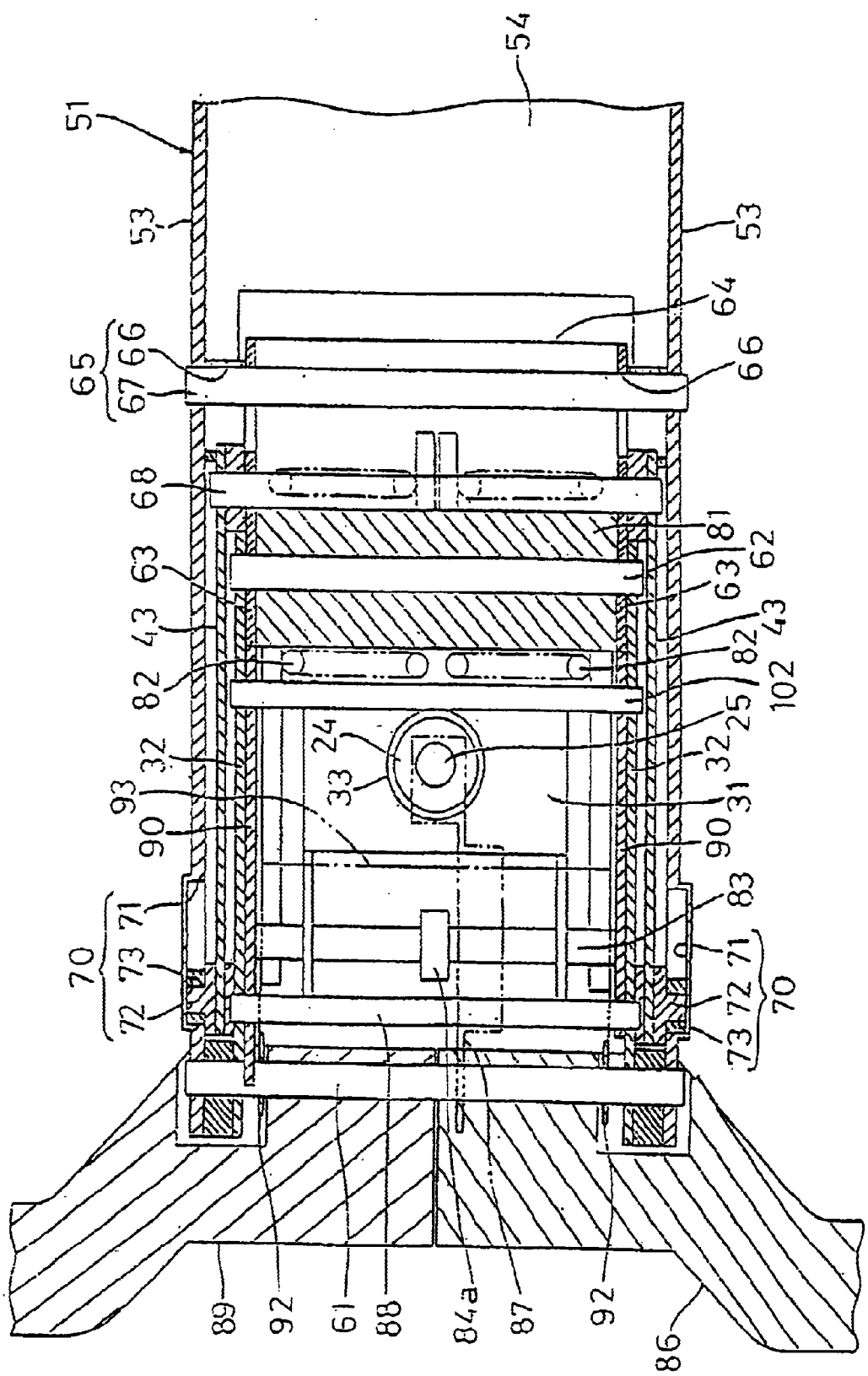
FIG. 4 is a sectional view taken on line X—X of FIG. 1.
Figure 12:
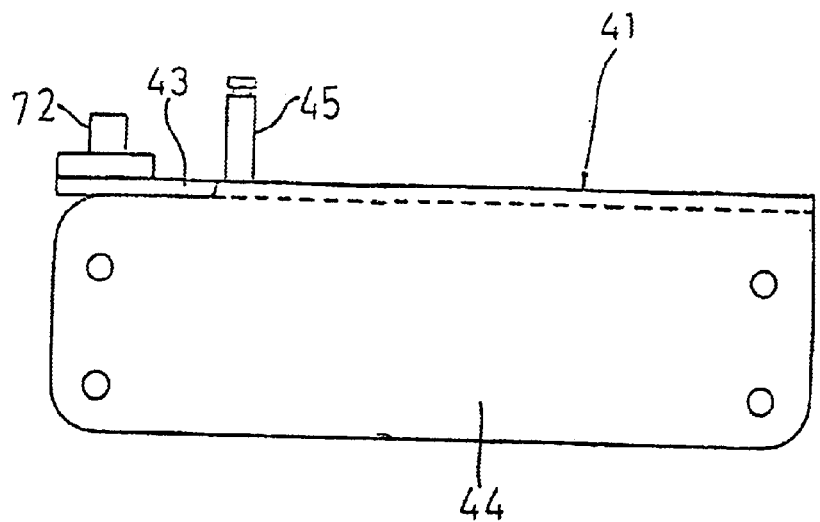
FIG. 12 is a view showing a seat frame used in the above-mentioned embodiment.
Figure 12:
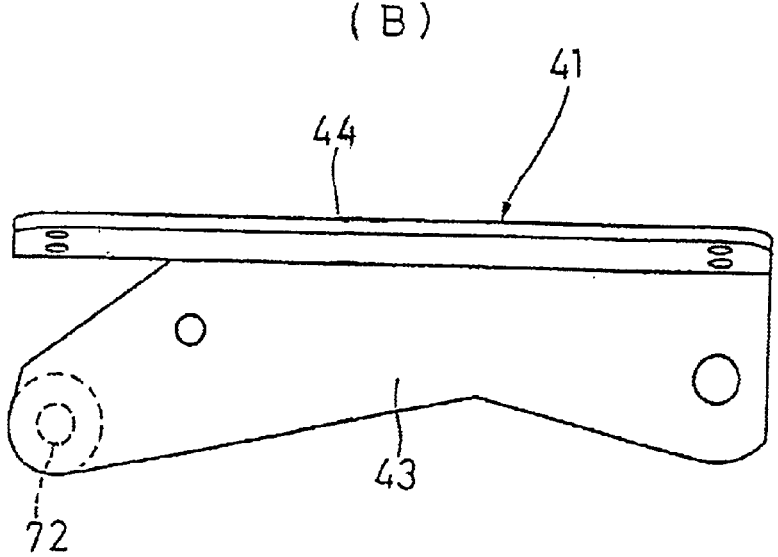
Figure 12:
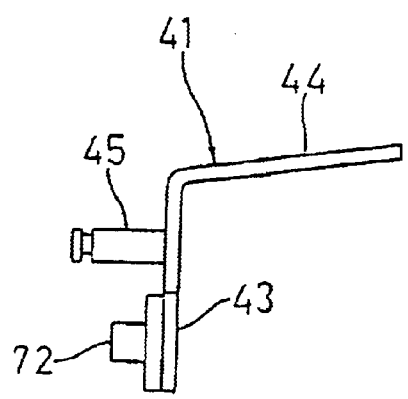

As shown in FIGS. 3 and 4, the seat 4 includes one pair of left and right seat frames 41, 41 (only one seat frame 41 is shown in FIG. 3), and a seat cushion 42 supported by the seat frames 41, 41. Each seat frame 41 includes, as shown in FIG. 12, a vertical plate portions 43 whose longitudinal direction is oriented in a forward and backward direction and whose widthwise direction is oriented in an upward and downward direction, and a support plate portion 44 projecting outward from an upper end of the vertical plate portion 43. Although the support plate portion 44 is inclined upward as it goes away from the vertical plate portion 43, it may take a horizontal posture. Each main frame is arranged such that the vertical plate portions 43 is opposed to the side plate portion 32 of the main frame 3 at the outside thereof, and the support plate portion 44 is located higher than the side plate portion 32.

Figure 10:
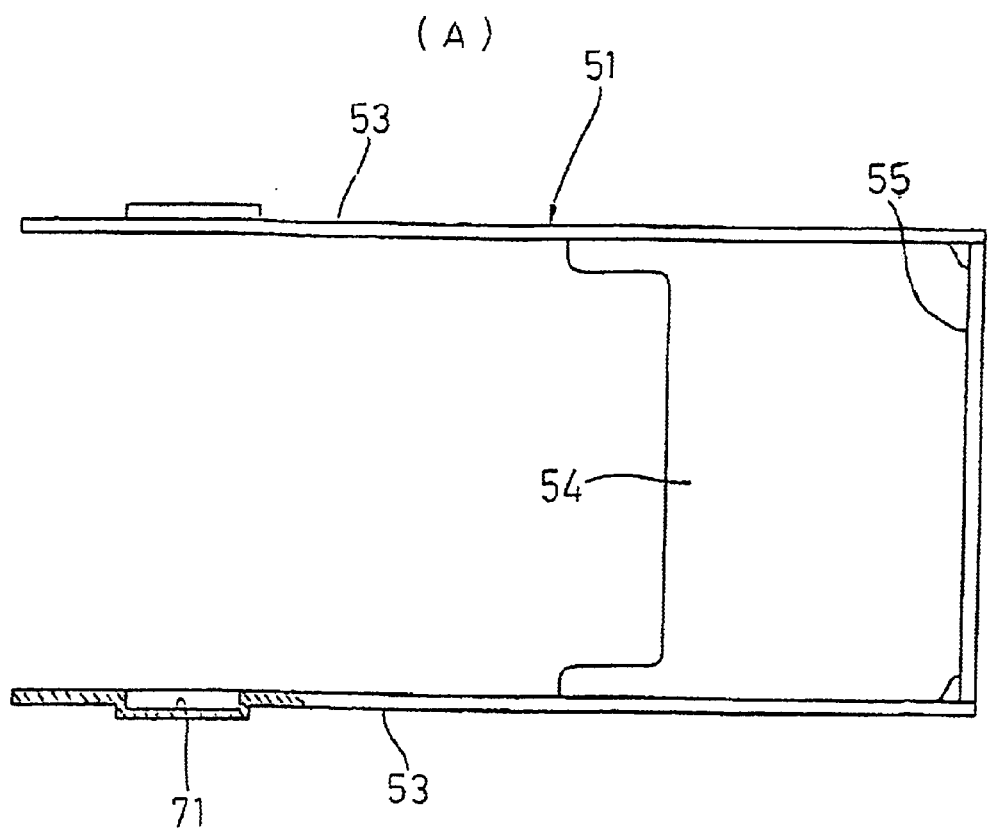
FIG. 10 is a view showing a seatback frame used in the above-mentioned embodiment.
Figure 10:
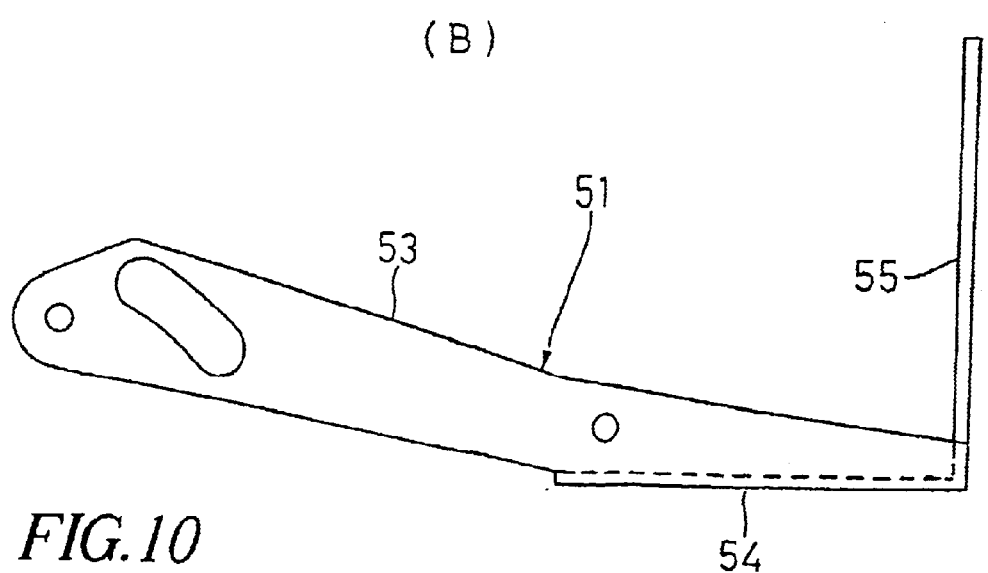

As shown in FIGS. 3 and 4, the seatback 5 includes a seatback frame 51 and a seatback cushion 52 disposed at a rear end upper part of the seatback frame 51. The seatback frame 51 comprises, as shown in FIG. 10, one pair of left and right arm portions 53, 53 extending in a forward and backward direction, a reinforcement plate portion 54 disposed between rear end parts of the arm portions 53, 53, and a back plate portion 55 fixed to a rear end parts of the arm portions 53, 53 and the reinforcement plate portion 54 and extending upward. The pair of arm portions 53, 53 are arranged such that forward end parts thereof are opposed to the side plate portions 32, 32 of the main frame 3 at the outside thereof. Moreover, as apparent from FIG. 4, the arm portions 53, 53 are arranged at the outside of the vertical plate portions 43, 43 of the seat frames 41, 41. The back plate portion 55 is provided with the seatback cushion 52.

The seatback cushion 52 of the seatback 5 can move between a working position indicated by a solid line of FIG. 3 and a relaxing position indicated by an imaginary line of FIG. 3. When the seatback cushion 52 (seatback 5) is tilted between the working position and the relaxing position, the seat cushion 42 of the seat 4 is tilted between from a position (this position of the seat cushion 42 (seat 4) is also hereinafter referred to as the "working position) indicated by a solid line and a position (this position of the seat cushion 42 (seat 4) is also hereinafter referred to as the relaxing position) indicated by an imaginary line.

That is to say, as shown in FIGS. 1, 2 and 4, a horizontal shaft 61 extending in a left and right direction is disposed between forward end parts of the side plate portions 32, 32 of the main frame 3. Opposite end parts of this shaft 61 are pierced through the side plate portions 32, 32 and projected outward. The projecting end parts of the shaft 61 are connected with forward end parts of the arm portions 53, 53 of the backseat frame 51. In other words, the forward end part of the seatback frame 51 is turnably connected to the forward end part of the main frame 3 through the shaft 61. The turning of the seatback frame 51 in the upward and downward direction about the forward end part thereof causes the seatback cushion 52 to be tilted in an upward and downward direction.

Figure 11:
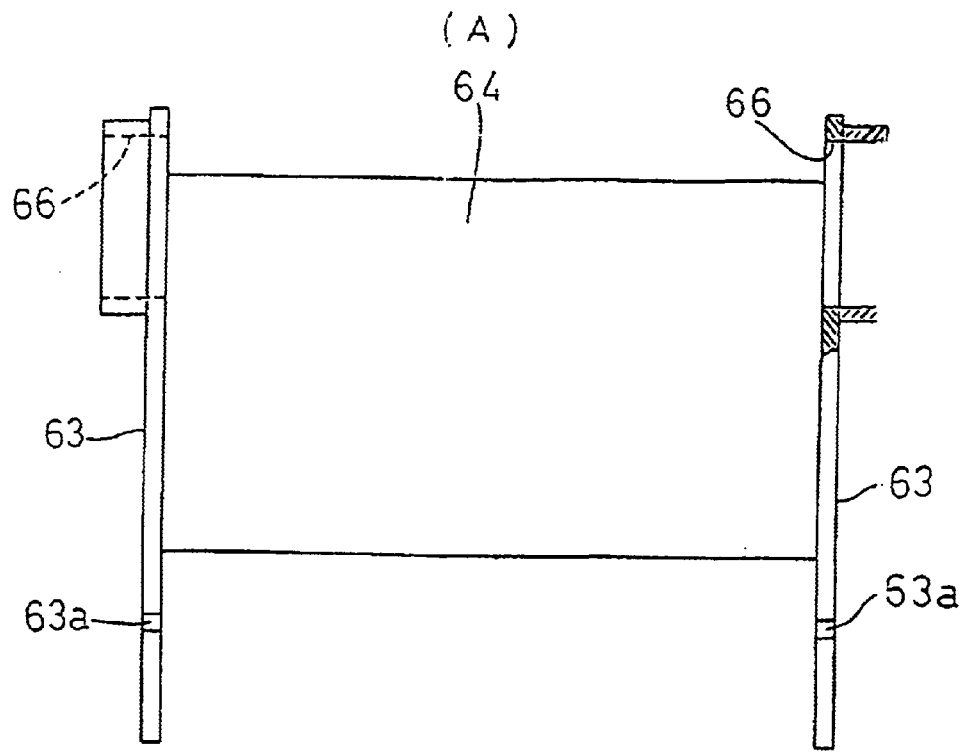
FIG. 11 is a view showing a connecting plate used in the above-mentioned embodiment.
Figure 11:
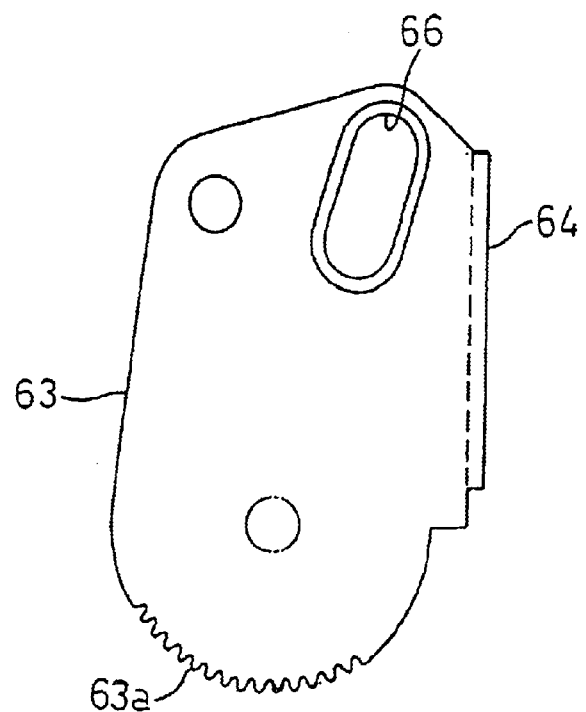

A horizontal shaft 62 extending leftward and rightward is disposed at rear end parts of side plate parts 32, 32 of the main frame 3. Lower end parts of a pair of connecting plates (links) 63, 63 are connected to opposite end parts of this shaft 62. The lower end parts of the pair of connecting plates 63, 63 are turnably connected to the main frame 3 through the shaft 62. As shown in FIG. 11, the pair of connecting plates 63, 63 are connected to each other through a reinforcement plate 64 such that they turn as an integral body. A positive motion cam mechanism (second positive cam mechanism) 65 is disposed between an upper end part of each connecting plate 63 located obliquely upward and rearward thereof and each arm part 53 of the seatback frame 51 adjacent to the connecting plate 63. The positive motion cam mechanism 65 includes a cam hole (second cam hole) 66 disposed at the connecting plate 63 and a shaft part (second shaft part) 67 disposed between the arm parts 53, 53. The cam hole 66 extends in a radial direction of the shaft 62.

The cam hole 66 is inclined rightward and upward with respect to the arm part 53. On the other hand, the shaft part 67 is horizontally fixed to the arm part 53 and movably fitted to the cam hole 66. Accordingly, when the arm part 53 is turned, the connecting plate 63 is turned in the same direction as the arm part 53 following the turning motion of the arm part 53.

The upper end part of the connecting plate 63 is turnably connected to a vertical plate part 43 of the seat frame 41 through a shaft 68. Accordingly, when the connecting plate 63 is turned about the shaft 62, the rear end part of the seat frame 41 is turned about the shaft 62. As a result, the rear end part of the seat frame 41 is displaced in an obliquely upward and downward direction. In this case, since the shaft 68 is arranged rightward, obliquely upward and rearward with respect to the shaft 62, when the seatback frame 51 is turned in a direction as indicated by an arrow X (direction from the working position side towards the relaxing position side) of FIG. 1, the rear end part of the seat frame 41 is displaced rightward and obliquely downward, and when the seatback frame 51 is turned in a direction as indicated by an arrow Y (direction from the relaxing position side towards the working position side) of FIG. 1, the rear end part of the seat frame 41 is displaced leftward, obliquely upward and forward. As apparent from this, the connecting plate 63 and the positive motion cam mechanism 65 constitute a displacement mechanism for displacing the rear end part of the seat frame 41 in an obliquely forward and backward direction in accordance with the turning motion of the seatback frame 51.

The forward end part of the seat frame 41 is connected to the seatback frame 51 without being connected, unlike the conventional one, to the main frame 3. That is to say, as shown in FIGS. 1, 2 and 4, a positive motion cam mechanism 70 is disposed between the arm parts 53 of the seatback frame 51 and forward end parts (forward end parts slightly rear end side than the shaft 61) of the vertical plate parts 43 of the seat frame 41. This positive motion cam mechanism 70 includes a cam hole 71 (see FIG. 10) and a shaft part 72 (see FIG. 12). The cam hole 71 is formed in the forward end part of the arm part 53. In this embodiment, although the cam hole 71 has a bottom part without piercing through the arm part 53, it may be a through-hole piercing through the arm part 53. On the other hand, the shaft part 72 is formed on an outward facing surface of the vertical plate part 43 in such a manner as to project in a horizontal direction therefrom and inserted in the cam hole 71 through a roller 73. The roller 73 is movable in a longitudinal direction of the cam hole 71 but non-movable in a widthwise direction. Accordingly, when the seatback frame 51 is turned, the front end part of the seat frame 41 is turned and displaced in accordance with the turning motion of the seatback frame 51. Moreover, as previously mentioned, when the seatback frame 51 is turned, the rear end part of the seat frame 41 is displaced. Thus, when the seatback frame 51 is tilted between the working position and the relaxing position, the entire seat frame 41 is tilted and displaced between the working position and the relaxing position in relation to the displacement of the rear end part and the displacement of the front end part.

As seen, in the chair 1 with a seatback according to this embodiment, the positive motion cam mechanism 70 is disposed between the seat frame 41 and the seatback frame 51, not between the seat frame 41 and the main frame 3. And the cam hole 71 of the positive motion cam mechanism 70 is formed in the seatback frame 51. In this chair 1, the cam hole 71 has, of course, a length in the upward and downward direction. However, since the lower end part (rear end part) of the cam hole 71 is displaced downward in accordance with the turning motion of the seatback frame 51 from the working position side to the relaxing position side, the length of the cam hole 71 in the upward and downward direction becomes shorter than the case wherein a cam hole is formed in the main frame 3. Accordingly, the width of the seatback frame 51 in the upward and downward direction can be reduced. Moreover, since the main frame 3 is not formed with a cam hole, its width in the upward and downward direction can be reduced. Thus, the main frame 3 and the seatback frame 51 can be made small in size.

The chair 1 with a seatback further comprises the following constitutional elements. Those constitutional elements will be described in sequence. As shown in FIGS. 1 and 2, the shaft 62 is provided with a spring retainer 81 having a circular configuration in section. One pair of coiled springs (only one coiled spring is shown in FIG. 1) 82 are wound around one and the other end parts of this spring retainer 81. One end part of each coiled spring 82 is supported by an adjustment shaft 83 horizontally disposed at the main frame 3, and the other end part is supported by the shaft 68. The coiled spring 82 biases the seatback frame 51 from the relaxing position side to the working position side through the shaft 68 and the positive motion cam mechanism 65. Accordingly, unless a larger force than the biasing force of the coiled spring 82 is exerted to the seatback cushion 52 in a direction from the working position side to the relaxing position side, the seat cushion 42 and the seatback cushion 52 (the seat 4 and the seatback 5) are held in the working position. In this case, by causing the roller 73 to be collided against an end part of the cam hole 71 on the side of the working position, the seat cushion 42 and the seatback cushion 52 are held in the working position. In the alternative, it is also accepted that by causing the shaft 67 to be abutted with the end part of the cam hole 66, the seat cushion 42 and the seatback cushion 52 are held in the working position.

Figure 5:
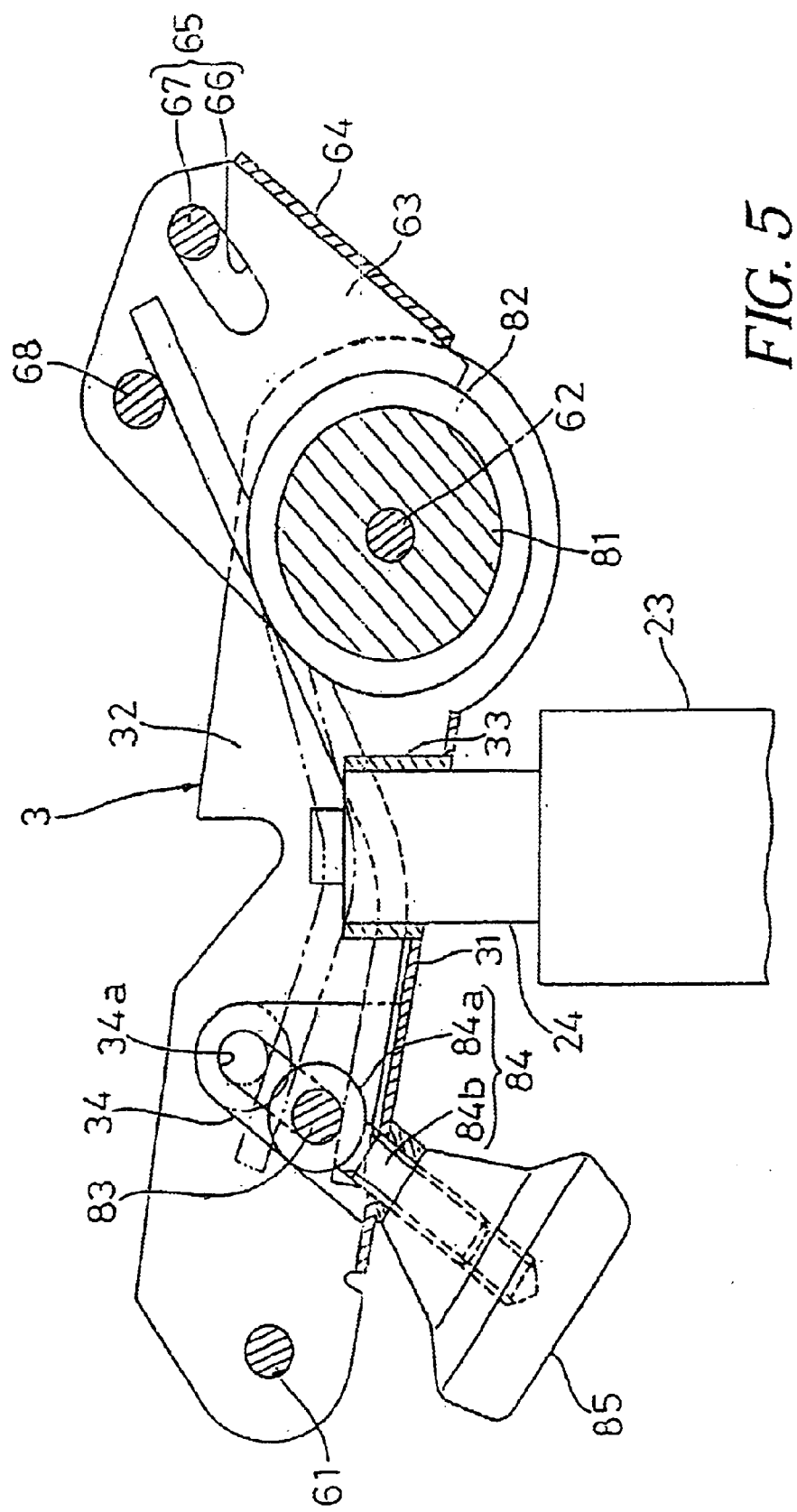
FIG. 5 is a sectional view, like FIG. 1, showing a construction for biasing the seatback frame of the above-mentioned embodiment from a relaxing position side to a working position side and a construction for adjusting the biasing force.

As shown in FIGS. 4, 5 and 9, one pair of guide pieces 34, 34 are fixed, in their erected postures, to opposite left and right sides of the bottom plate part 31 of the main frame 3. A guide hole 34a is formed in each guide piece 34. The guide hole 43a extends rightward and obliquely upward. Opposite end parts of the adjustment shaft 83 are movably inserted in each guide hole 34a in a longitudinal direction of the guide hole 34a. A head part 84a of a screw member 84 is engaged with the adjustment shaft 83. A threaded part 84b of this screw member 84 pierces through the bottom plate part 31 and projects downward. The lower part of the threaded part 84b is threadingly engaged with a handle 85. This handle 85 is in abutment with the bottom plate part 31. Accordingly, when the handle 85 is turned, the adjustment shaft 83 is moved in an upward and downward direction. By this, the biasing force of the coiled spring 82 can be adjusted.

Figure 6:
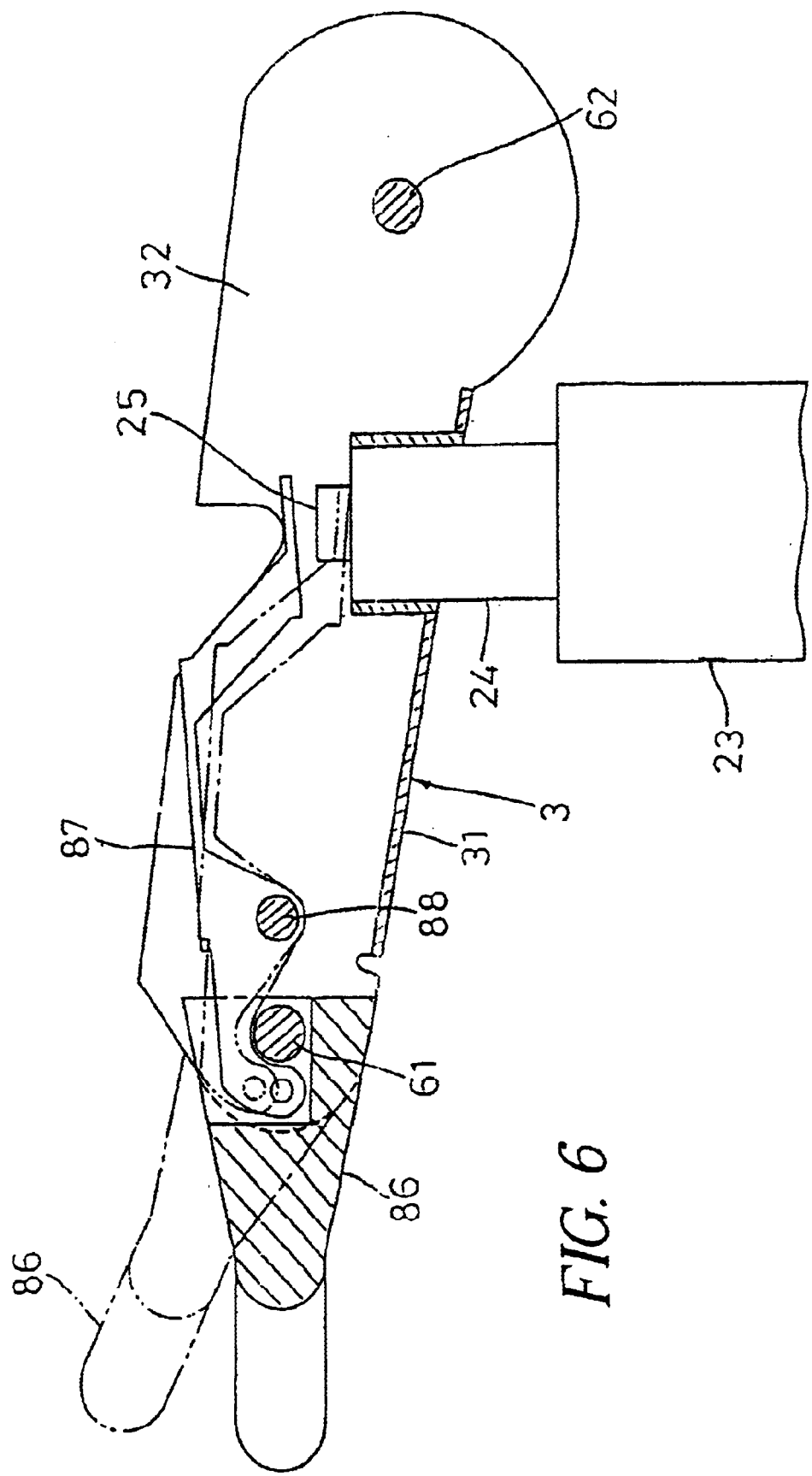
FIG. 6 is a sectional view, like FIG. 1, showing a construction for adjusting the height of a support leg of the above-mentioned embodiment.

As shown in FIGS. 4 and 6, a rear end part of a control lever 86 is turnably disposed at one end side of the shaft 61. This control lever 86 is turnable between a fixing position as indicated by a solid line and an adjusting position as indicated by an imaginary line (see FIG. 6). The control lever 86 is connected to a forward end part of a control arm 87. An intermediate section of this control arm 87 is turnably engaged with a shaft 88 disposed between the side plate parts 32, 32 of the main frame 3. A rear end part of the control arm 87 is vertically faced with a control button 25 disposed at the upper end part of the support leg 24 such that when the control lever 86 is turned into the adjusting position, it depresses the control button 25. When the control button 25 is depressed, a movement mechanism disposed between the support sleeve 23 and the support leg 24 causes the support leg 24 to move upward until it reaches the uppermost position. Of course, the support leg 24 can be moved downward by pushing down the seat 42 against the biasing force of the movement mechanism. Then, by returning the control lever 86 to the original position after adjusting the support leg 24 to a proper height, the support leg 24 and hence the seat cushion 42 can be fixed to a desired height.

Figure 7:
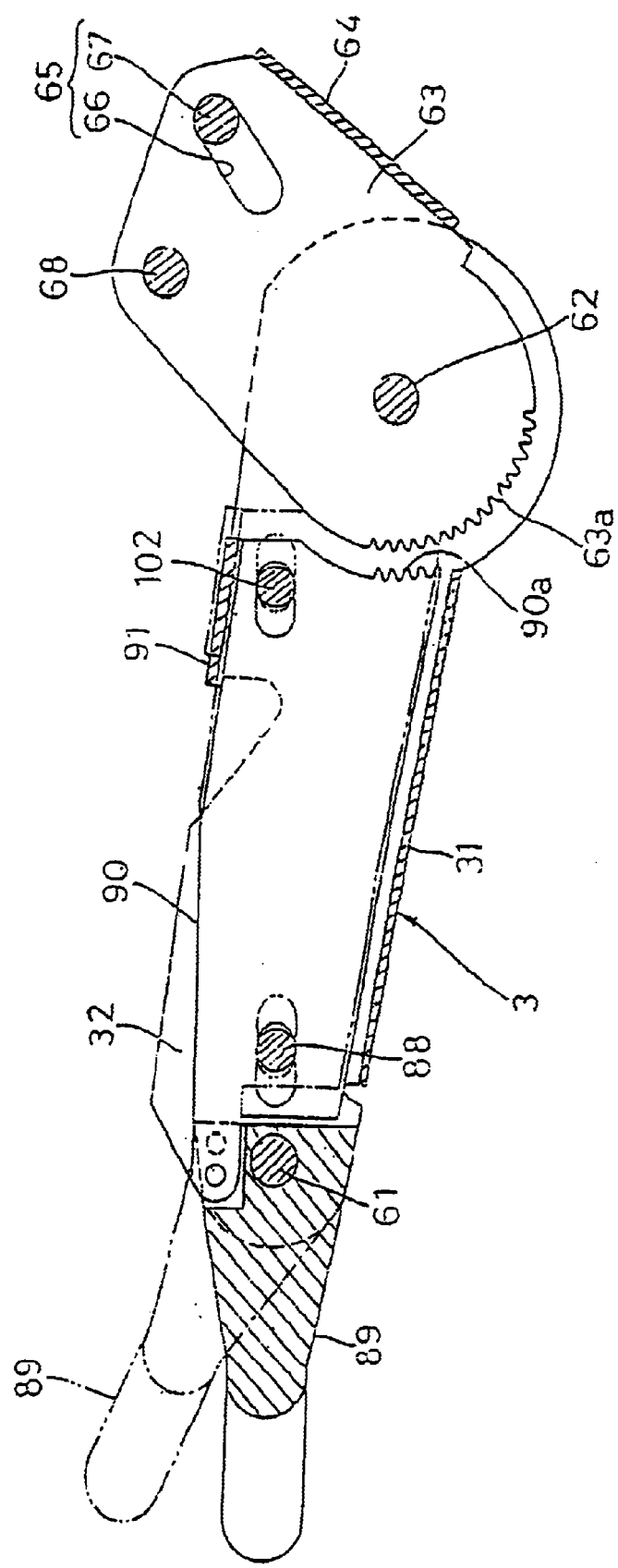
FIG. 7 is a sectional view, like FIG. 1, showing a construction for anchoring a connecting plate of the above-mentioned embodiment to the working position.

As shown in FIGS. 4 and 7, a rear end part of the control lever 89 is turnably disposed at the other end side of the shaft 61. This control lever 89 can be turned between a release position as indicated by a solid line and an engagement position as indicated by an imaginary line (see FIG. 7). A forward end part of an engagement plate (engagement member) 90 arranged along an inner side of the side plate part 32 (one of the side plate parts 32, 32) of the main frame 3 is connected to the control lever 89. This engagement plate 90 is moved in a forward and backward direction in accordance with the turning motion of the control lever 89. An engagement plate 90 is also disposed at an inner side of the other side plate part 32 of the main frame 3. The engagement plate 90 is connected to its counterpart (the first-mentioned engagement plate) 90 through a connecting plate 91. Accordingly, when the control lever 89 is operated, the two engagement plates 90, 90 are caused to move in unison in a forward and backward direction.

A plurality of engagement teeth 63a are formed in a circumferential direction at predetermined pitches on an outer peripheral surface of the connecting plate 63 which is faced with the engagement plate 90. A plurality of engagement teeth 90a are formed at the same pitches as the engagement teeth 63a on a rear end face of the engagement plate 90 which is faced with an outer peripheral surface of the connecting plate 63. When the engagement plate 90 is moved backward, the engagement teeth 63a, 90a are brought into engagement with each other. Moreover, a rear end part of the engagement plate 90 is prohibited from movement in an upward and downward direction by a shaft 102. Accordingly, when the engagement teeth 63a, 90a are engaged with each other, the connecting plate 63 becomes unable to turn and the seatback frame 51 is positionally fixed. In this case, the seatback frame 51 can not only be positionally fixed to the working position or relaxing portion but also be positionally fixed for each pitch of the engagement teeth 63a, 90a therebetween by changing the engaging place of the engagement teeth 63a with respect to the engagement teeth 90a.

Figure 8:
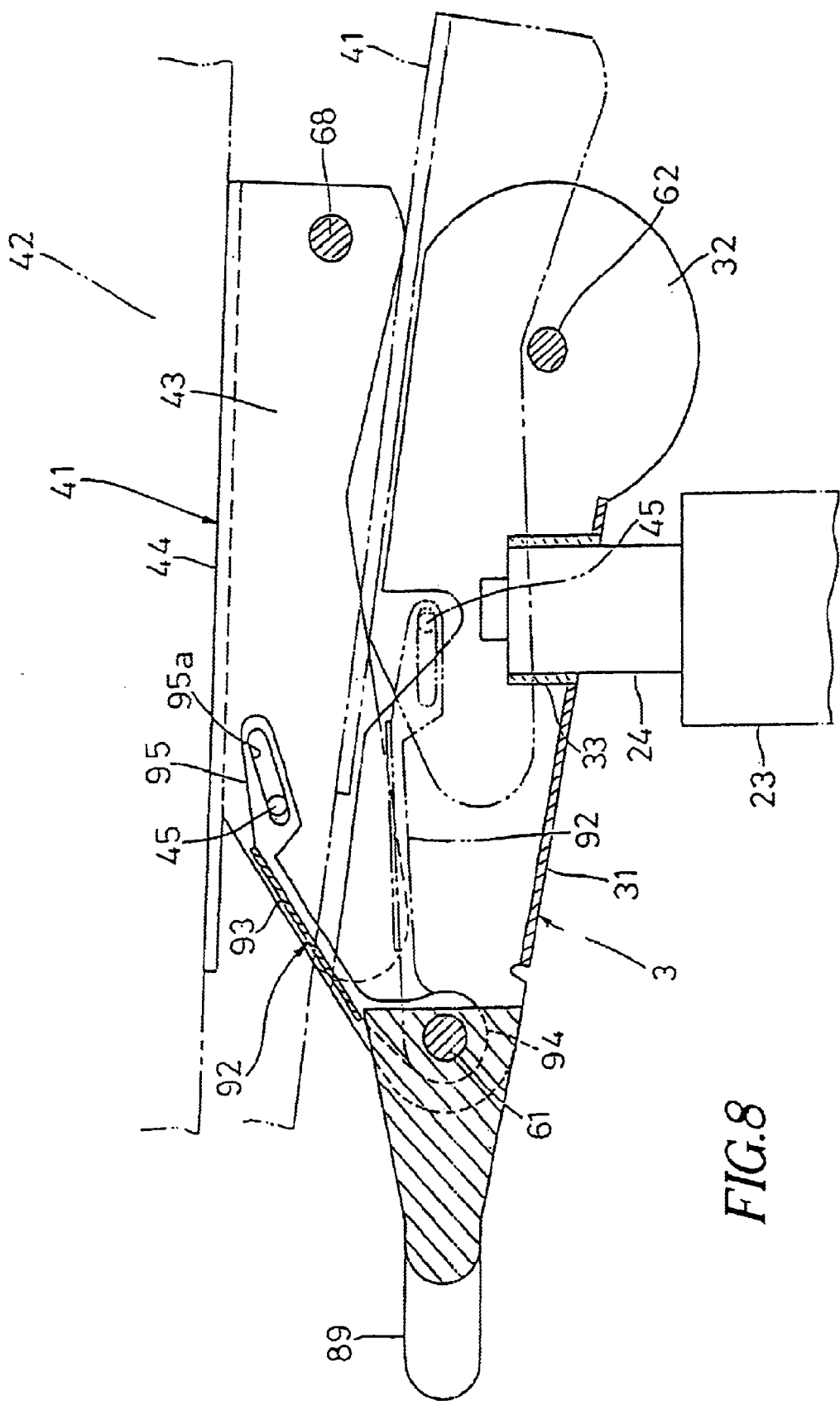
FIG. 8 is a sectional view, like FIG. 1, showing a construction for shielding a gap formed between the seat of the above-mentioned sheet and a control lever.

As shown in FIG. 8, a gap is formed between the seat cushion 42 of the seat 4 and the control levers 86, 89 disposed at the forward end part of the main frame 3. An interval in an upward and downward direction of this gap is comparatively large when the seat cushion 42 is in the working position but it becomes smaller when the seatback cushion 42 is turned into the relaxing position. For this reason, when the seat cushion 42 is turned from the working position to the relaxing position with a finger inserted between the seat cushion 42 and the control levers 86, 89, the finger may be hurt by being caught between the seat cushion 42 and the control levers 86, 89.

In order to prevent such an inconvenience, this chair 1 employs a shielding plate 92 for shielding the gap formed between the seat cushion 42 and the control levers 86, 89. This shielding plate 92 includes a shielding part 93 for shielding the gap between the seat cushion 42 and the control levers 86, 89. A connecting part 94 is formed on opposite end parts of the shielding part 93 on its front side. This connecting part 94 is turnably connected to the shaft 61. A control part 95 is formed on opposite sides of a rear end part of the shielding part 93, and a cam hole 95a is formed in this control part 95. A shaft part 45, which is formed on the vertical plate part 43 of the seat frame 41 in such a manner as to be orthogonal to the vertical plate part 43, is movably inserted in the cam hole 95a in a longitudinal direction of the cam hole 95a. The shaft part 45 and the cam hole 95a constitute the positive motion cam mechanism. This positive motion cam mechanism maintains the gap between the upper end of the shielding part 93 and the seat cushion 42 small enough so that a finger will not be inserted therein.

It should be noted that the first form of the present invention is not limited to the above embodiment but that changes can be made in accordance with necessity.

For example, in the above embodiment, although the cam hole 71 of the positive motion cam mechanism 70 is formed in the seatback frame 51 and the shaft part 72 is formed on the seat frame 41, it is also accepted that the cam hole 71 is formed in the seat frame 41 and the shaft part 72 is formed on the seatback frame 51. The same is also applicable to the cam hole 66 and the shaft part 67 of the positive cam mechanism (second positive cam mechanism) 65.

Figure 13:
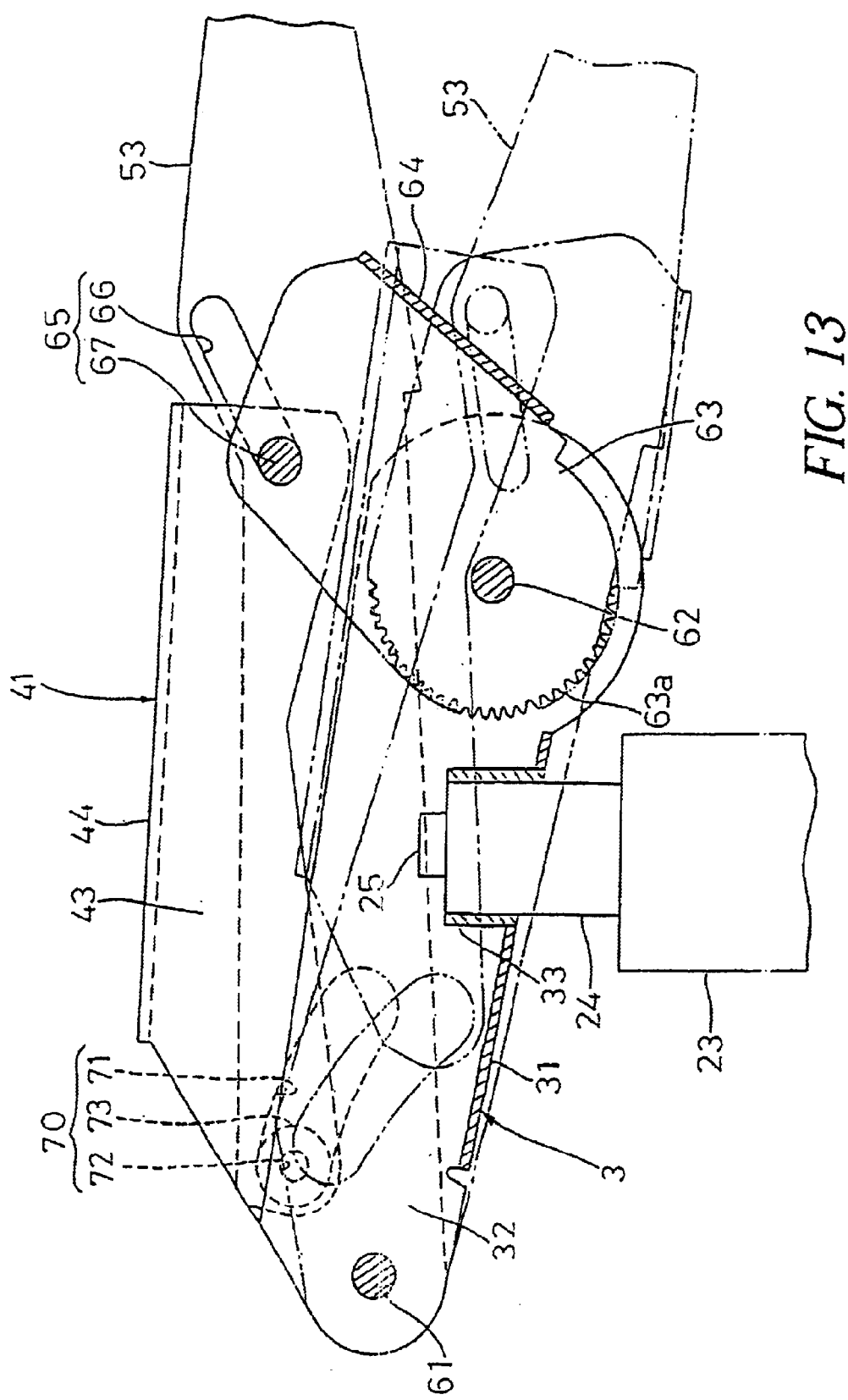
FIG. 13 is a sectional view, like FIG. 1, showing a second embodiment of the first form of the present invention.

Moreover, in the above embodiment, although the connecting plate 63 and the seat frame 41 are connected to each other through the shaft part 68, as in the embodiment of FIG. 13, it is also accepted that the connecting plate 63 and the seat frame 41 are connected to each other through the shaft part 67 of the positive motion cam mechanism 65. In this case, since the attitudes of the connecting plate 63 and the seat frame 41 are mutually changed as they are turned, at least one of the connecting plate 63 and the seat frame 41 is turnably connected to the shaft part 67. The remaining constitution of the embodiment shown in FIG. 13 is the same as the above-mentioned embodiment.

Moreover, in the above embodiment, since the main frame 3 is provided at the forward end part thereof with the control levers 86, 89 and the pair of seat frames 41, 41 are arranged at the outside of the main frame 3, the shielding plate 92 is arranged between the control levers 86, 89 and the seat 42. In the case where the control levers 86, 89 are not provided and the support plate parts 44, 44 of the seat frames 41, 41 are integrally connected to each other to face with the main frame 3, the shielding plate 92 is disposed between the main frame 3 and the seat frame 41.

Next, one embodiment of the second, third and fourth forms of the present invention will be described with reference to FIGS. 14 to 27.

Figure 14:
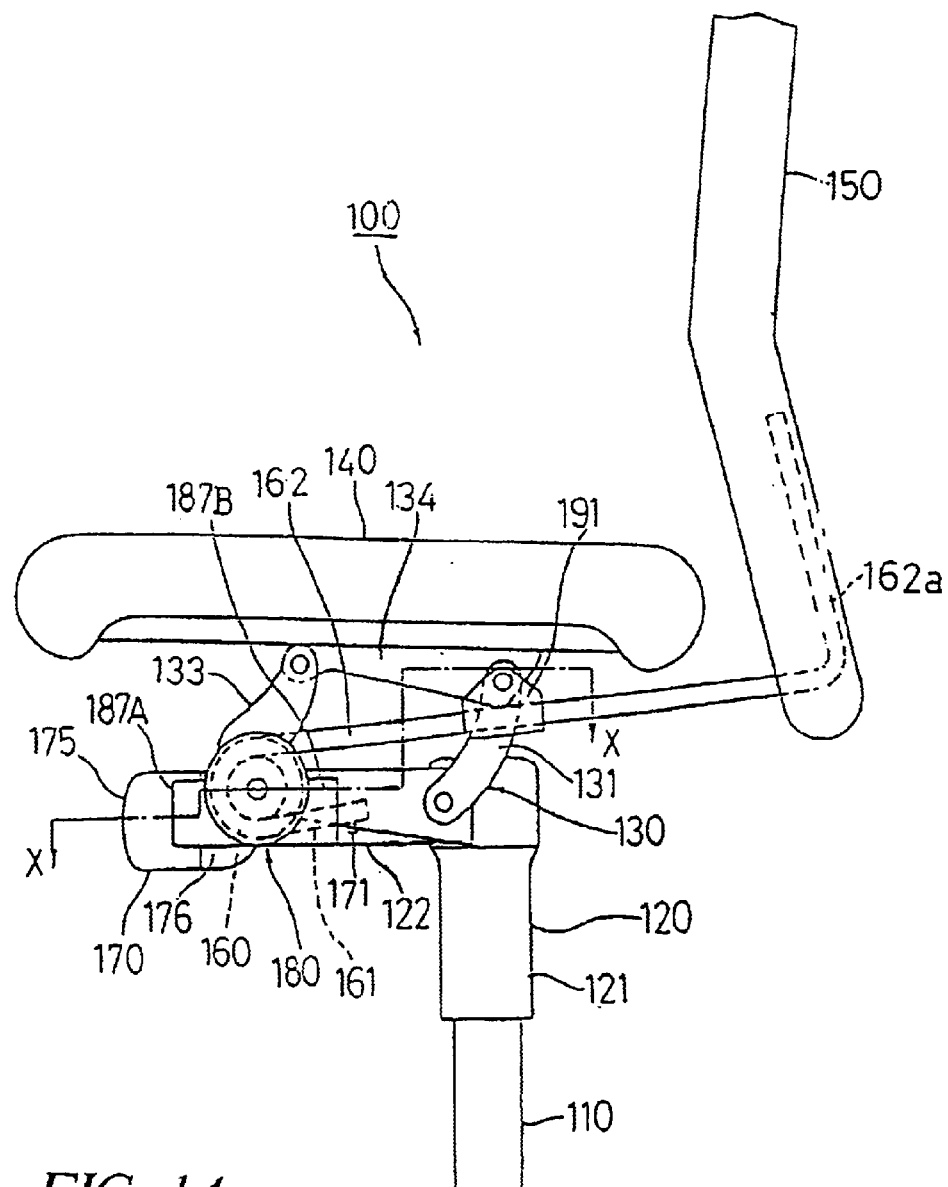
FIG. 14 is a partly omitted side view showing one actual example of a second and a fourth form of the present invention, in which a seat is tilted to a working position.
Figure 15:
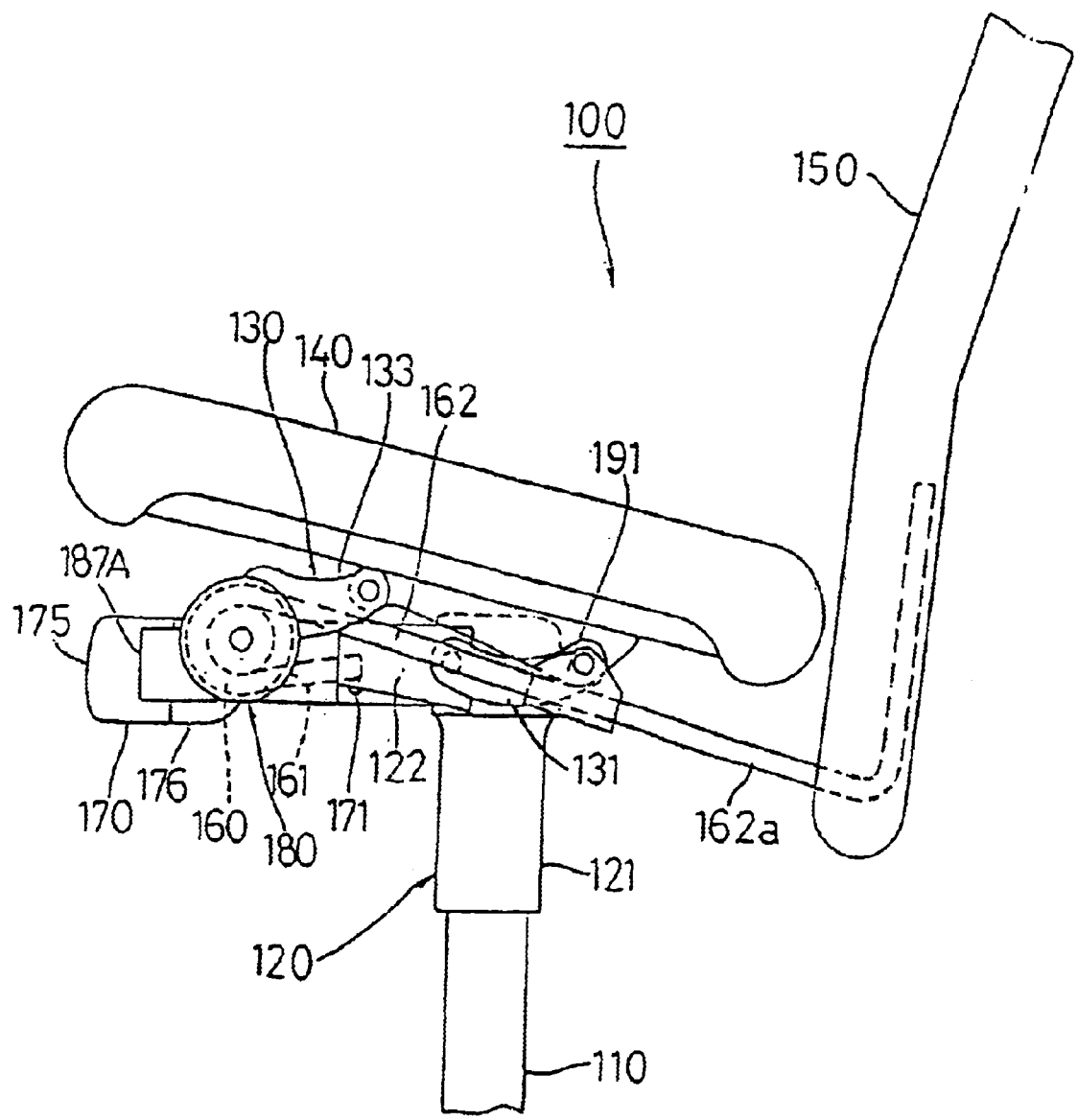
FIG. 15 is a view, like FIG. 1, showing a state in which the seat is tilted to a relaxing position.
Figure 16:
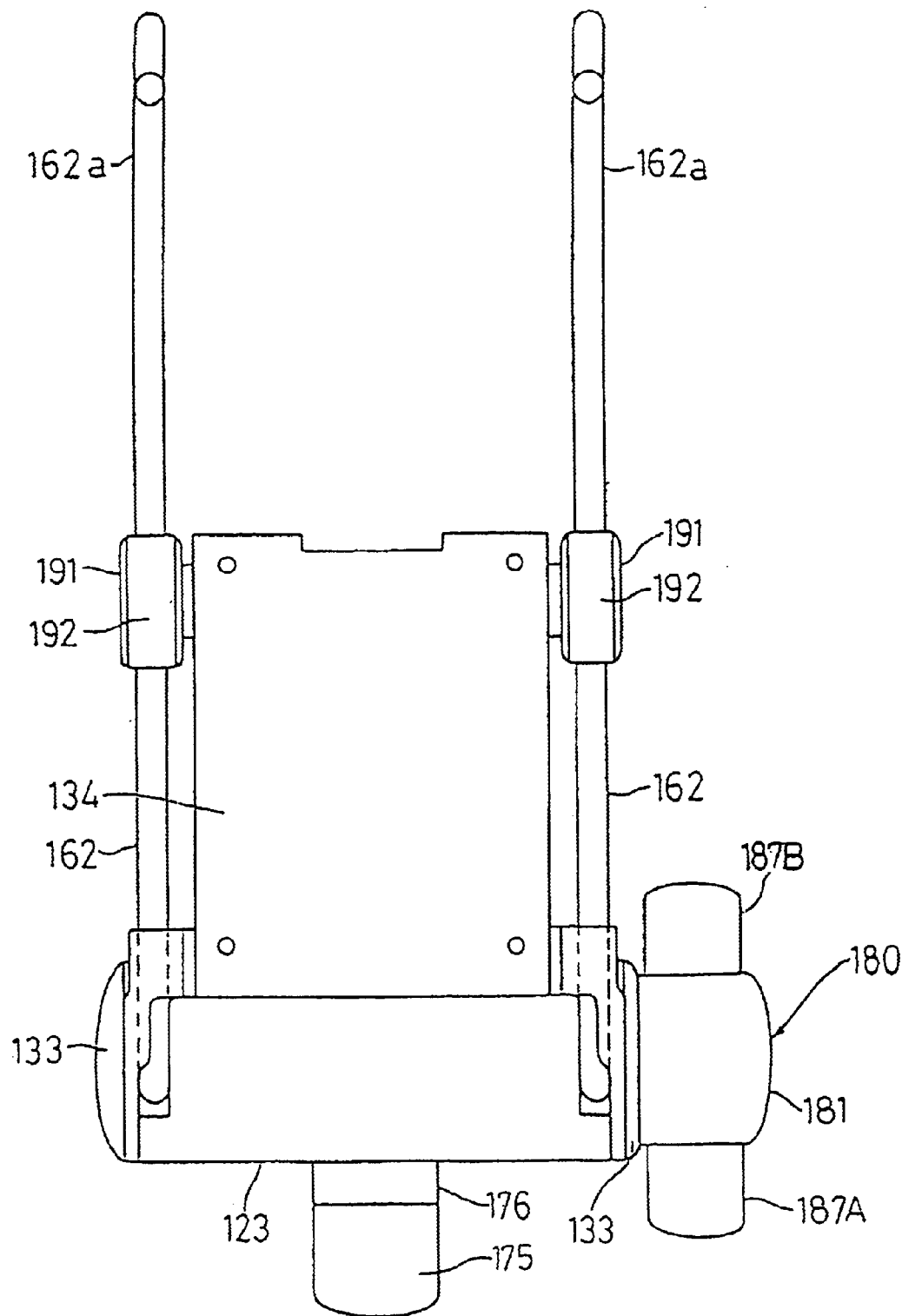
FIG. 16 is a plan view of the above-mentioned embodiment, in which a seat cushion and a seatback cushion are omitted.
Figure 17:
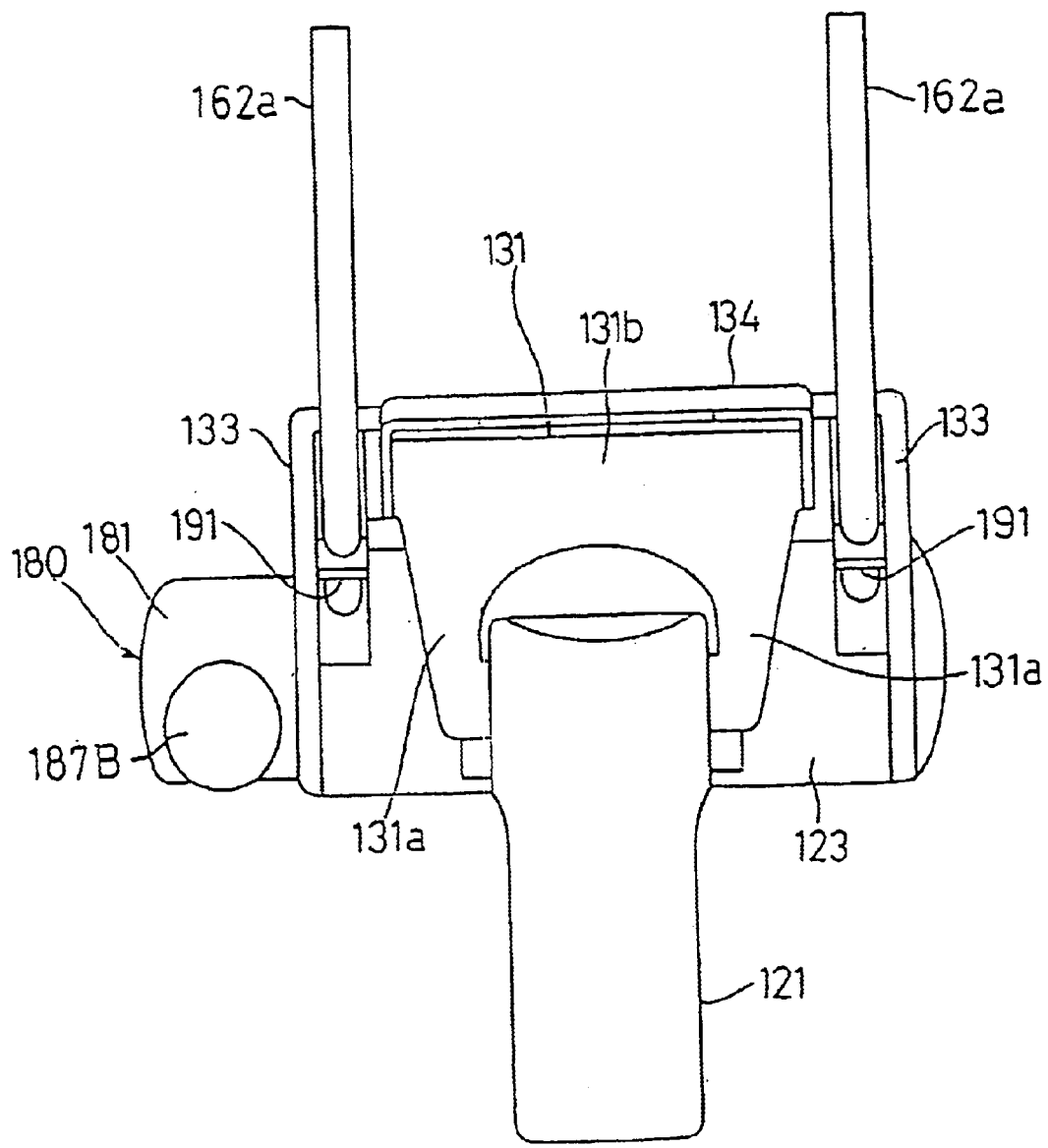
FIG. 17 is a rear view of the above.

As shown in FIGS. 14 and 15, a chair 100 with a seatback according to this embodiment comprises a support leg 110 having four or five casters (not shown) at a lower end part thereof, a main frame 120 disposed at an upper end part of the support leg 110, a seat 140 tiltably supported by this main frame 120 through a tilting mechanism 130 and capable of tilting between a working position shown in FIG. 14 and a relaxing position shown in FIG. 15, a seatback 150 tilted in accordance with the tilting motion of the seat 140, a coiled spring (biasing means) 160 for biasing the seat 140 from the relaxing position side to the working position side, an adjustment mechanism 170 for adjusting the biasing force of this coiled spring 160, and a rotary damper 180 for restricting a high speed tilting of the seat 140 and the seatback 150.

Figure 18:
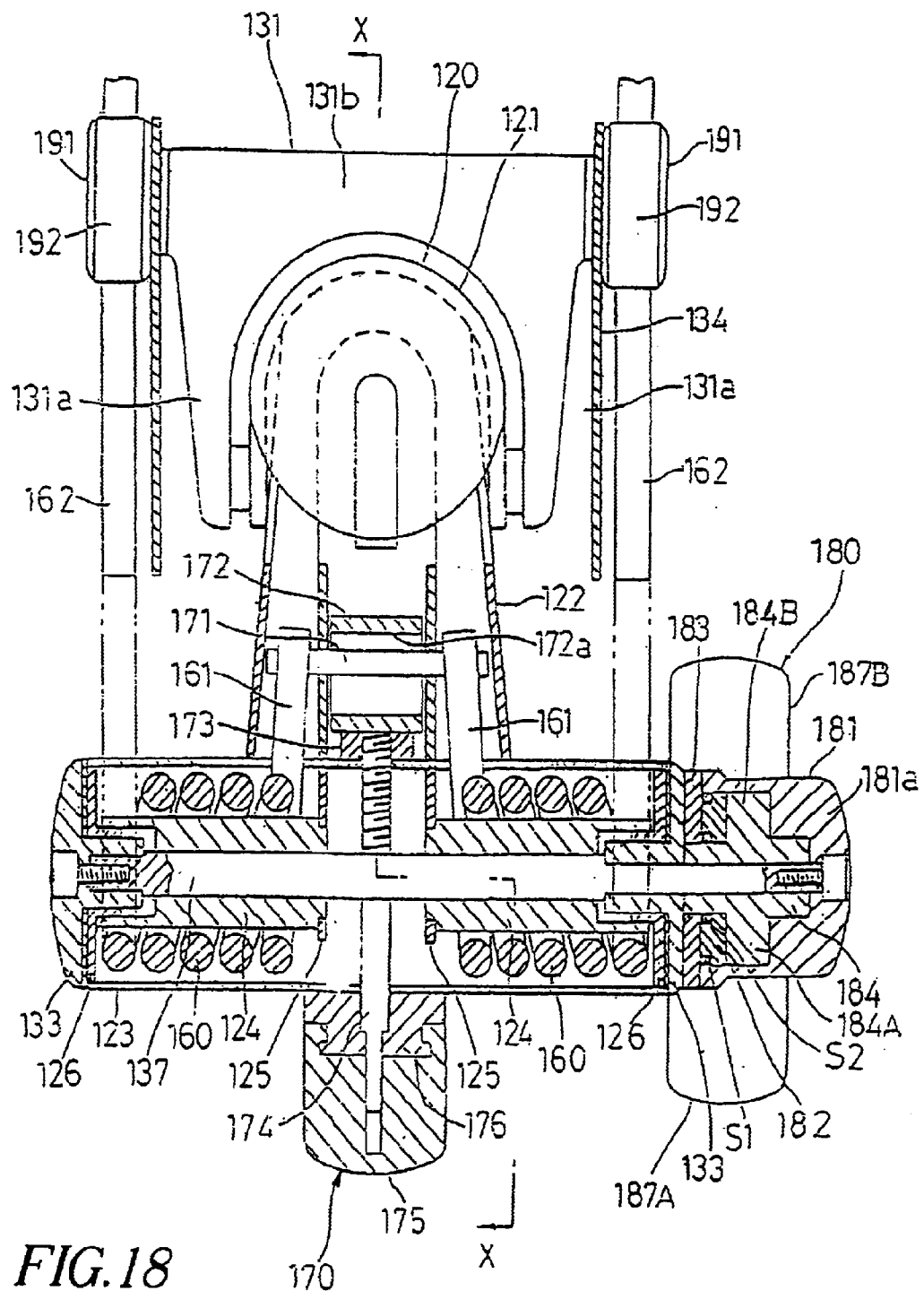
FIG. 18 is an enlarged sectional view taken on line X—X of FIG. 1.
Figure 20:
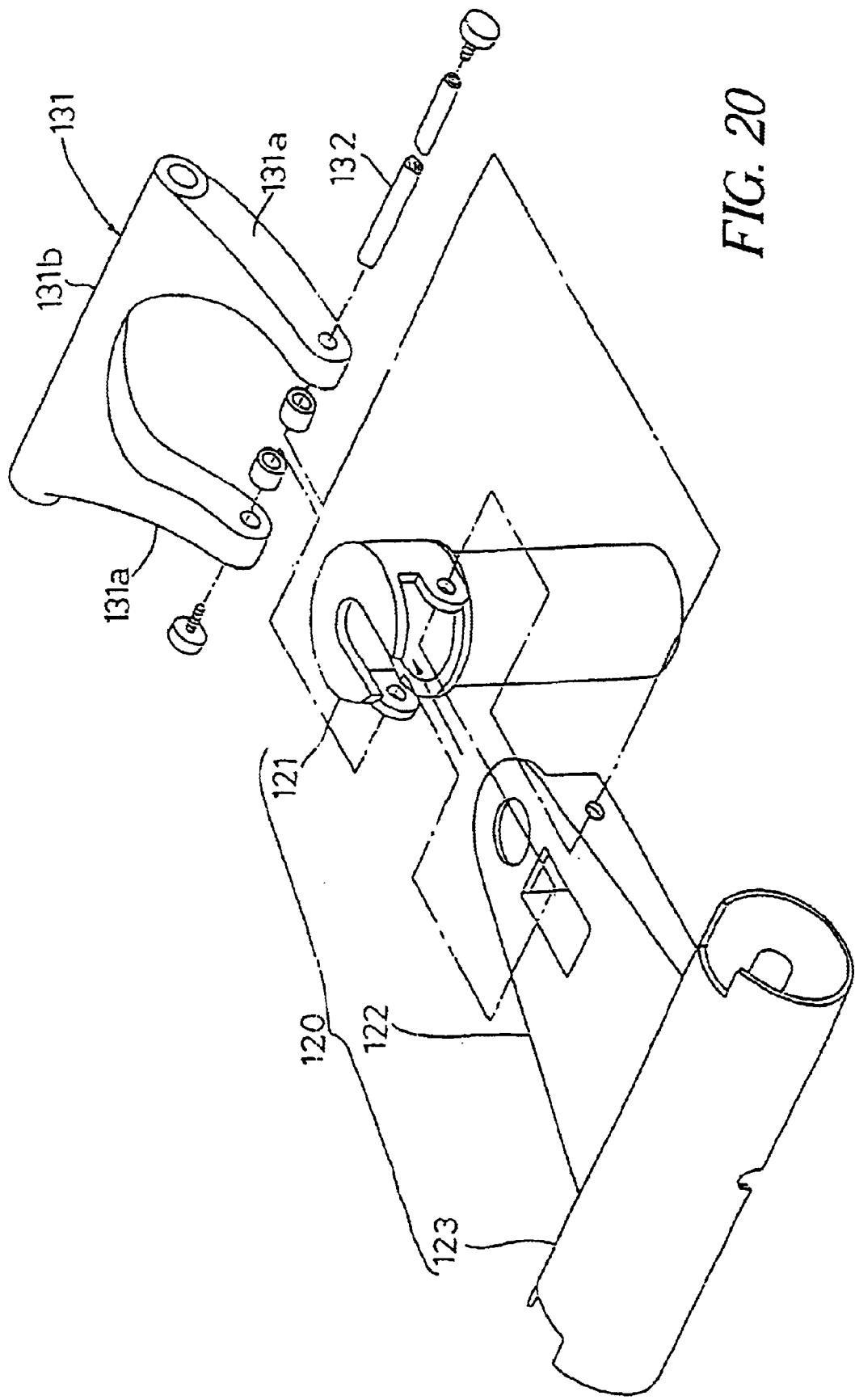
FIG. 20 is an exploded perspective view showing a main frame and a rear side turning link of the above-mentioned embodiment.
Figure 21:
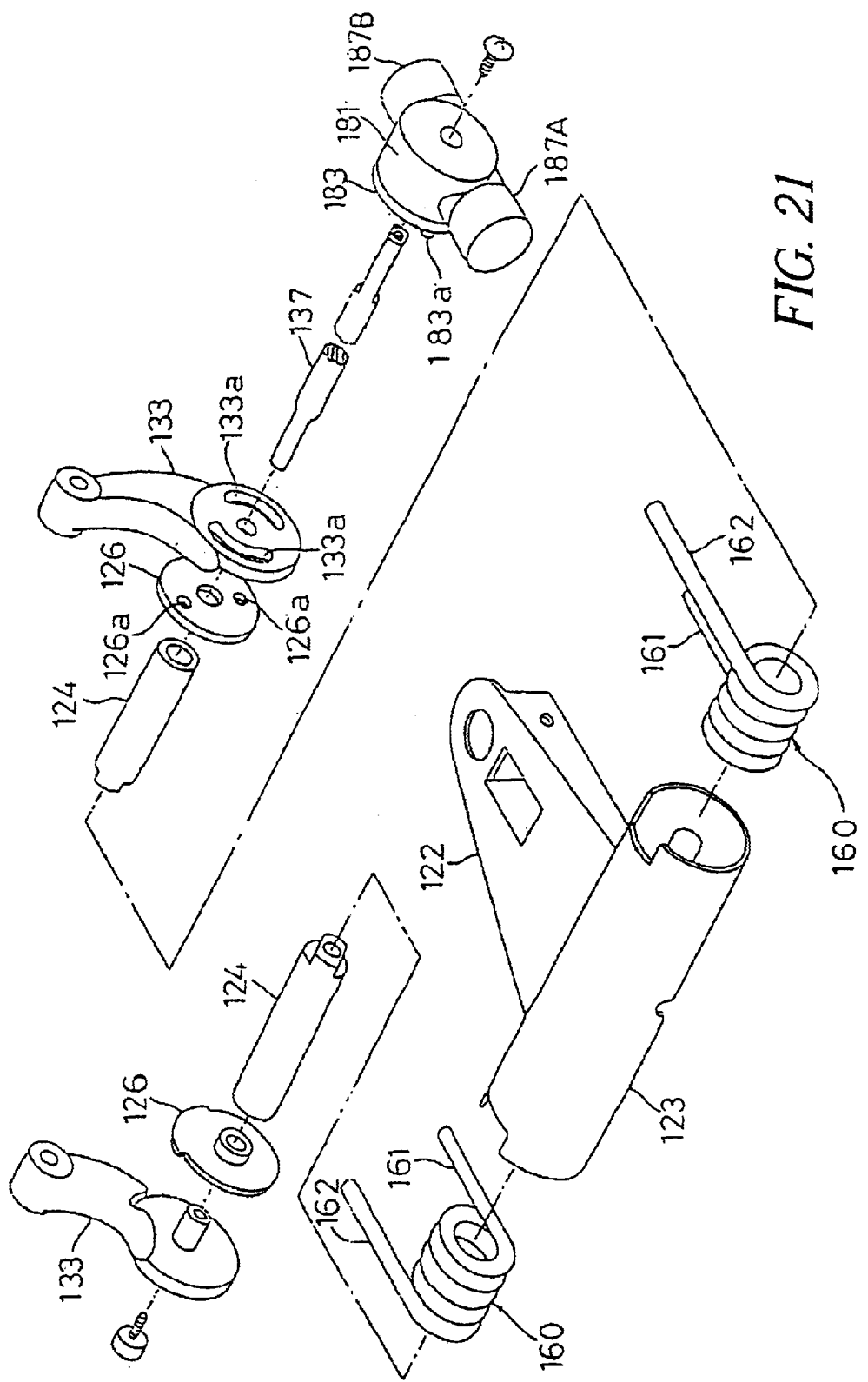
FIG. 21 is an exploded perspective view showing a rear side turning link and a seat frame of the above-mentioned embodiment.

The main frame 120 includes, as shown in FIG. 20, a main sleeve part 121 extending upward and downward. This main sleeve part 121 is, as shown in FIGS. 14 and 15, externally fixedly inserted to an upper end part of the support leg 110. One end part of a support part 112 extending forward is fixed to an upper end part of the main sleeve part 121. A central part of a receiving sleeve 123 horizontally extending in a leftward and rightward direction is fixed to the other end part of the support part 122. As shown in FIG. 18, one pair of retaining sleeves 124, 124 are arranged at one and the other end parts within the receiving sleeve 123 with their axes aligned with the axis of the retaining sleeve 123. Opposite end parts of each retaining sleeve 124 are fixed to the receiving sleeve 123 through a support plate 125 and a bottom plate 126.

Figure 19:
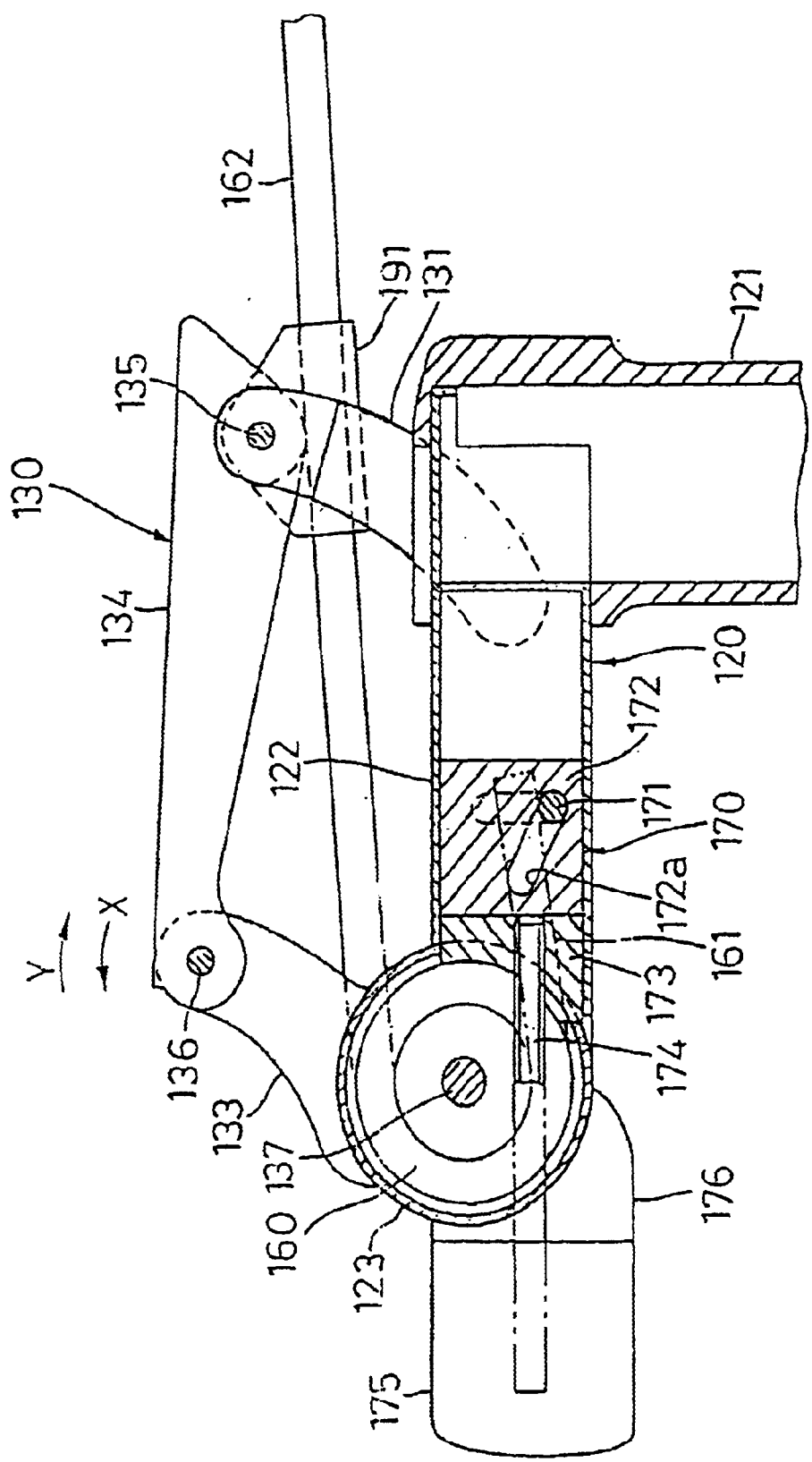
FIG. 19 is an enlarged sectional view taken on line X—X of FIG. 5.

The seat 140 is tiltably supported by the main frame 120 through the tilting mechanism 130. As shown in FIGS. 19 and 20, a rear turning link 131 is arranged at a rear end side of the main frame 120. This rear turning link 131 comprises one pair of arm parts (one pair of turning links on the rear side) 131a, 131a, and a connecting part 131b for connecting upper end parts of this pair of arm parts 131a, 131a to each other. Lower end parts of the pair of arm parts 131a, 131a are arranged at opposite left and right sides of the frame 120 and turnably connected to the frame 120 through a horizontal shaft 132 extending in a leftward and rightward direction. The pair of arm parts 131a, 131a may be independent of each other without being connected to each other through the connecting part 131b. In that case, the independent two arm parts 131a, 131a serve as the pair of turning links on the rear side.

As shown in FIGS. 17 to 19 and 21, one pair of front turning links (turning links on the front side) 133, 133 are arranged at opposite left and right sides of the receiving sleeve 123. Lower end parts of the front turning links 133, 133 are turnably connected to the receiving sleeve 123 through the bottom plates 126, 126. Accordingly, the front turning links 133, 133 are turnable in an upward and downward direction about an axis of the receiving sleeve 123. As later described, the turning range of the front turning links 133 is restricted to a predetermined range. When the front turning link 133 is turned to a turning limit position in a direction as indicated by an arrow X of FIG. 19, the seat 140 occupies the working position. On the other hand, when the front turning link 133 is turned to a turning limit position in a direction as indicated by an arrow Y of FIG. 19, the seat 140 occupies the relaxing position. The front turning links 133, 133 are non-turnably connected to opposite end parts of a connecting shaft 137 piercing the retaining sleeves 124, 124, so that the front turning links 133, 133 are turned in synchronism with each other (see FIG. 18).

Figure 22:
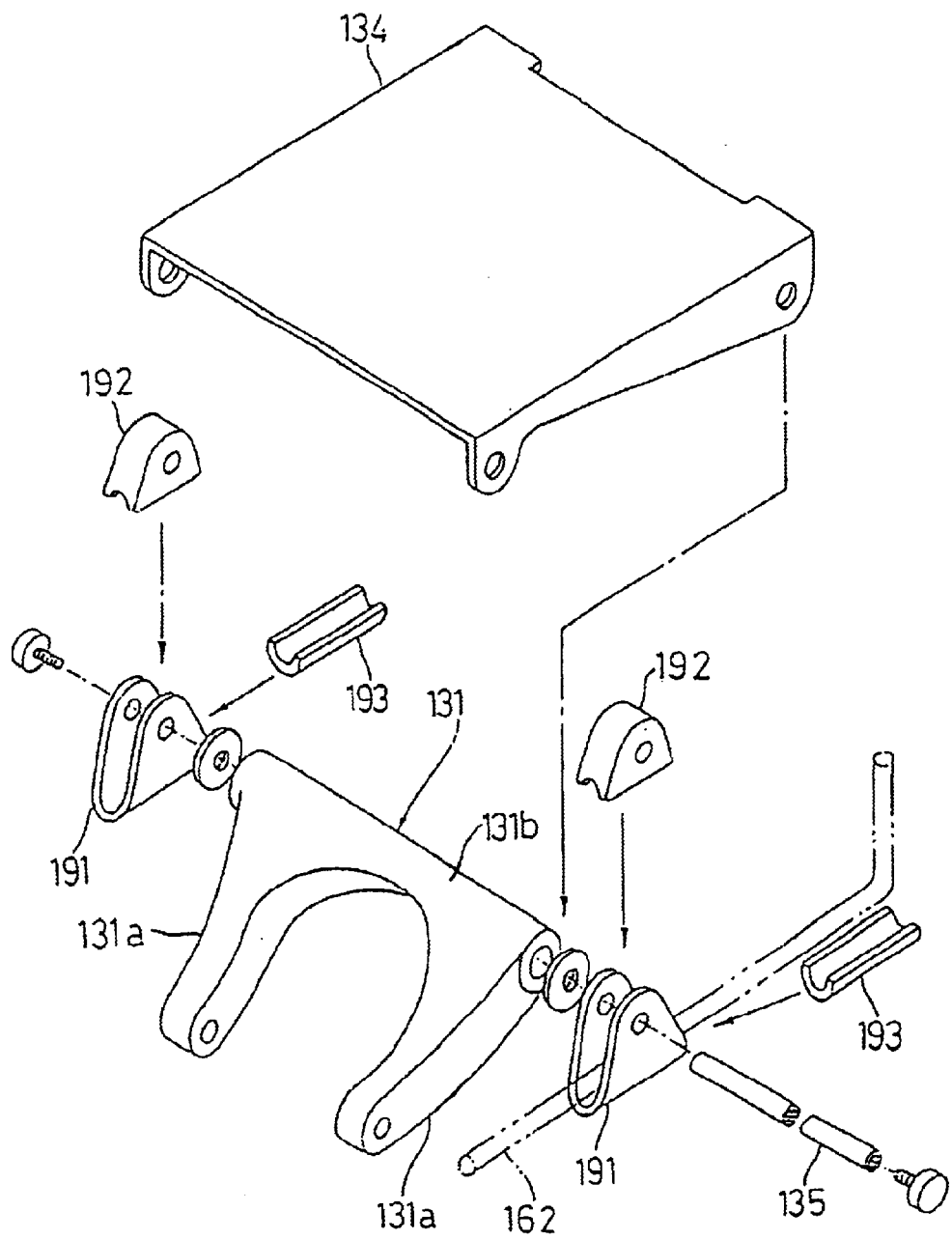
FIG. 22 is an exploded perspective view showing the main frame, a front side one pair of turning links, one pair of coiled springs and a rotary damper of the above-mentioned embodiment.
Figure 23:
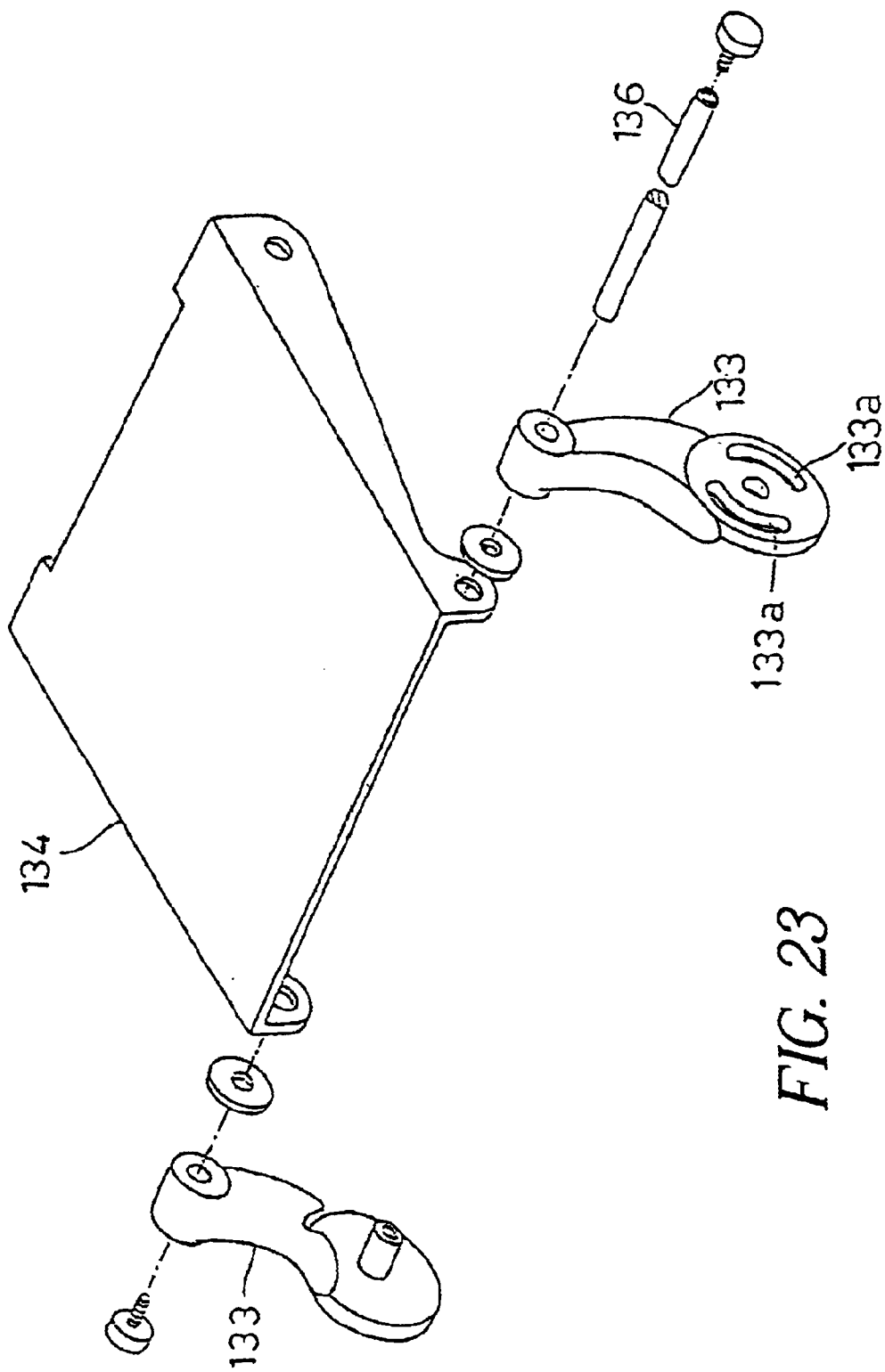
FIG. 23 is an exploded perspective view showing front side one pair of turning links and a seat frame of the above-mentioned embodiment.

As shown in FIG. 22, the rear end side opposite left and right side parts of an attachment plate 134 are turnably connected to the upper end parts of the arm parts 131a, 131a of the rear turning link 131 through a horizontal shaft 135 extending in a leftward and rightward direction. On the other hand, the forward end side opposite left and right side parts of the attachment plate 134 are, as shown in FIG. 23, turnably connected to upper end parts of the pair of front turning links 133, 133 through a horizontal shaft 136 extending in a leftward and rightward direction. As a result, the attachment plate 134 is tilted in accordance with the turning motion of the turning links 131, 133. That is to say, the attachment plate 134 is moved in a forward and backward direction and turned in an upward and downward direction in accordance with the turning motion of the turning links 131, 133. The seat 140 is fixed to an upper surface part of the attachment plate 134. Accordingly, the seat 140 is also tilted in accordance with the turning motion of the turning links 131, 133. The upper end parts of the turning links 131, 133 may be turnably connected directly to the seat 140 instead of through the attachment plate 134.

As shown in FIGS. 18 and 19, coiled springs 160, 160 are disposed in annular spaces between an inner peripheral surface of the receiving sleeve 123 and outer peripheral surfaces of the retaining sleeves 124, 124. Mutually adjacent one end parts 161, 161 of the coiled springs 160, 160 are inserted in the support part 122 extending backward from the receiving sleeve 123. The one end parts 161, 161 inserted in the support part 122 are supported by the support part 122 through a support shaft 171 of an adjustment mechanism 170 as later described. The other ends (those end parts for biasing the seat 140) 162, 162 of the coiled springs 160, 160 are extended backward from the receiving sleeve 123 and are connected to the upper end parts of the arm parts 131a, 131a of the rear turning links 131 such that they can relatively turn and relatively move in a forward and backward direction.

That is to say, as shown in FIG. 22, a bracket 191 having a U-shape in section is turnably supported by the upper end part of the arm part 131a through the shaft 135. One pair of guide bodies 192, 193 are inserted in the bracket 191. The other end part 162 of the coiled spring 160 is movably inserted between the pair of guide bodies 192, 192 in a forward and backward direction. Accordingly, the other end part 162 of the coiled spring 160 is non-movably connected to the rear turning link 131 in an upward and downward direction through the guide bodies 192, 193 and the bracket 191. The coiled spring 160 biases the rear turning link 131 so as to be turned upward. By this, the seat 140 is biased from the relaxing position side to the working position side through the rear turning link 131. Normally, the seat 140 is held in the working position by the other end part 162 of the coiled spring 160. When the seat 140 is tilted, the other end part 162 of the coiled spring 160 is turned relative to the seat 140 and relatively moved in a forward and backward direction.

Figure 24:
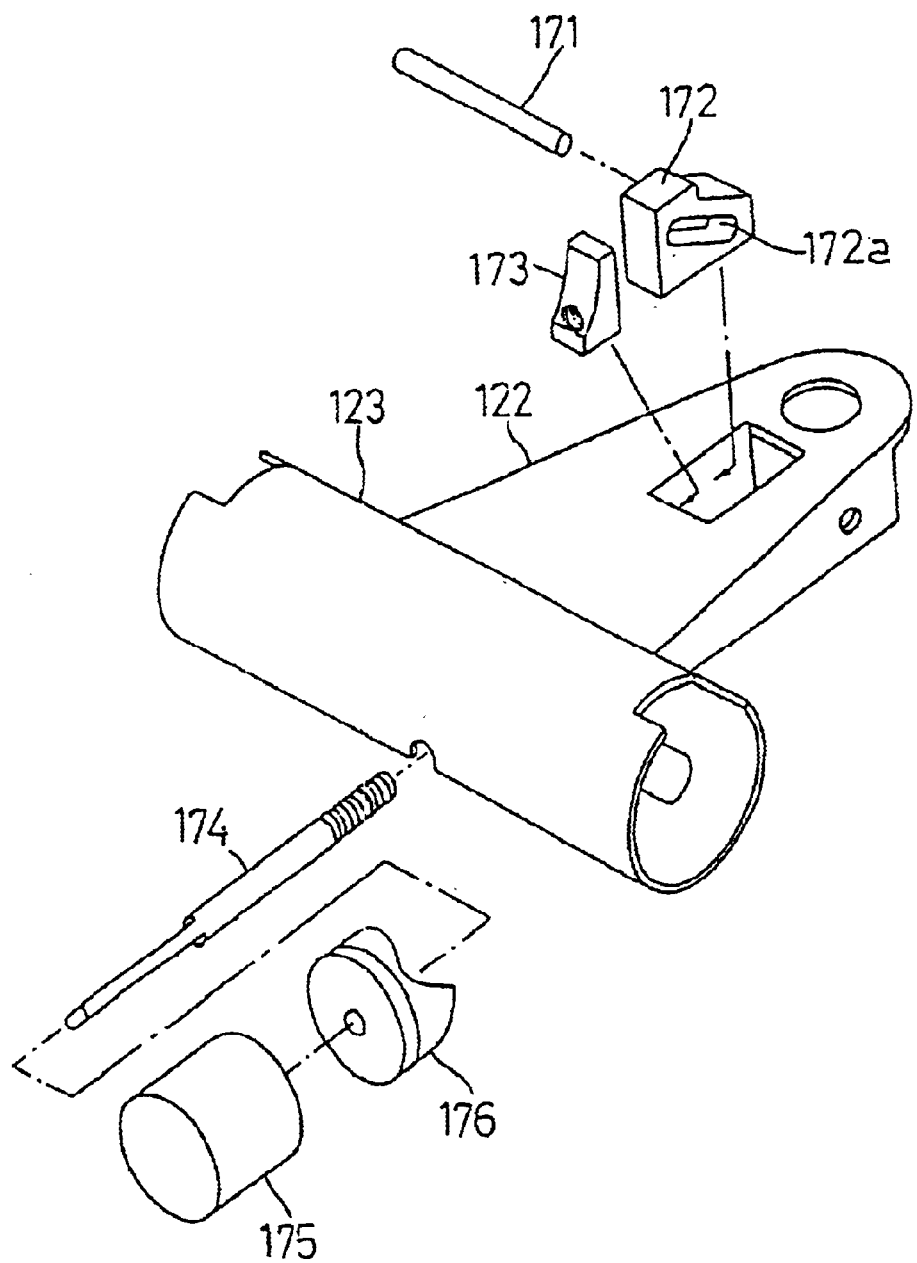
FIG. 24 is an exploded perspective view showing the main frame and an adjustment mechanism of the above-mentioned embodiment.

The biasing force of the coiled spring 160 against the seat 140 is adjusted by an adjustment mechanism 170. This adjustment mechanism 170 will be described. As shown in FIGS. 18, 19 and 24, the support shaft 171, whose longitudinal direction is oriented in a leftward and rightward direction, is disposed at an intermediate part of the support part 122 such that the support shaft 171 can move in an upward and downward direction but it cannot move in a forward and backward direction. One end parts 161, 161 of the coiled springs 160, 160 are in abutment with an upper side part of an outer periphery of opposite end parts of the support shaft 171. Accordingly, the support shaft 171 is biased downward by the coiled springs 160, 160. A movable piece 172 is disposed at the support part 122 such that the movable piece 172 can move in a forward and backward direction but it cannot move in an upward and downward direction. This movable piece 172 has a cam hole 172a which is inclined upward towards the front. The support shaft 171 is inserted in this cam hole 172a. Accordingly, the movable piece 172 is biased forward by the coiled spring 160 through the support shaft 171. When the movable piece 172 is moved forward, the support shaft 171 is moved downward and one end parts 161, 161 of the coiled springs 160, 160 are displaced downward. As a result, the biasing force of the coiled springs 160, 160 is reduced. On the contrary, when the movable piece 172 is moved backward, the support shaft 171 is moved upward and one end parts 161, 161 of the coiled springs 160, 160 are displaced upward. As a result, the biasing force of the coiled springs 160, 160 is increased.

A female screw member 173 is fixed to a more forward side than the movable piece 172 of the support part 122. A rear end part of a screw shaft 174 extending in a forward and backward direction is threadingly engaged with the female screw member 173. A rear end face of this screw shaft 174 is press contacted with a front face of the movable piece 172. On the other hand, a front end part of the screw shaft 174 is allowed to traverse the receiving sleeve 123 and project forward of the sleeve 123. The screw shaft 174 is connected to the adjustment member 175 arranged at a central part in a leftward and rightward direction of the receiving sleeve 123 such that the screw shaft 174 cannot turn but it can move in a forward and backward direction. This adjustment member 175 is supported by the receiving sleeve 123 through a rotary seat 176 such that the adjustment member 175 can turn but it is positionally fixed. Accordingly, when the adjustment member 175 is turned, the screw shaft 174 is moved in a forward and backward direction and the movable piece 172 is moved in a forward and backward direction in accordance with the movement of the screw shaft 174. By this, the biasing force of the coiled spring 160 is adjusted.

As shown in FIGS. 14 to 17, the other end part 162 of the coiled spring 160 is further extended backward from the bracket 191. Supposing that section of the other end part 162 of the coiled spring 160 which extends backward from the bracket 191 as a forward end part 162a, this forward end part 162a is bent at generally right angles at a location on a rear side from the seat 140 and extended upward. Those parts in the vicinity of the bent parts and the upwardly extended parts of the forward end parts 162a, 162a support opposite left and right sides of a lower end part of the seatback 150. Accordingly, in this embodiment, the forward end part 162a of the coiled spring 160 also serves as a support arm for supporting the seatback 150. Thus, the seatback part 150 is tilted in accordance with the tilting motion of the seat 140. Moreover, since the forward end part 162a has substantially resilient property, when the forward end part 162a is elastically deformed in such a manner as to be twisted about an imaginary line extending upward and downward through a generally central area of the seatback part 150, the seatback part 150 is turned in a horizontal direction about the imaginary line. Accordingly, the user can twist his body with his back kept pressed against the seatback part 150. However, if the forward end part 162a is overly elastically deformable, it cannot support the user's body rested on the seatback part 150. Therefore, the elasticity of the forward end part 162a may properly be determined by strength test or the like so that the forward end part 162a causes the seatback part 150 to turn in a horizontal direction about a generally vertical axis and yet the forward end part 162a can support the user's body with the seatback part 150.

In order to restrict the high speed tilting of the seat 140 and the seatback 150, the rotary damper 180 is disposed at one end part (the right end part of FIG. 18 in this embodiment) of the receiving sleeve 123. As shown in FIGS. 18, 19 and 25 to 27, the rotary damper 180 includes a main body (apparatus main body) 181. This main body 181 exhibits a cylindrical configuration with a bottom by forming a receiving hole H within the main body 181. The main body 181 is arranged with its opening part oriented towards the receiving sleeve 123 side. A seal material retaining body 182 is engaged with an inner peripheral surface of the opening part side of the main body 181. As shown in FIG. 18, a space between an outer peripheral surface of the seal material retaining body 182 and an inner peripheral surface of the main body 181 and a space between an inner peripheral surface of the seal material retaining body 182 and an outer peripheral surface of a rotor 184 as later described are sealed with seal members S1, S2 such as O-rings or the like. By this, a hermetically closed annular space is formed between the inner peripheral surface of the main body 181 and the outer peripheral surface of the rotor 184. A viscous fluid such as silicon oil or other fluids (not shown) are filled in this annular space.

Figure 27:
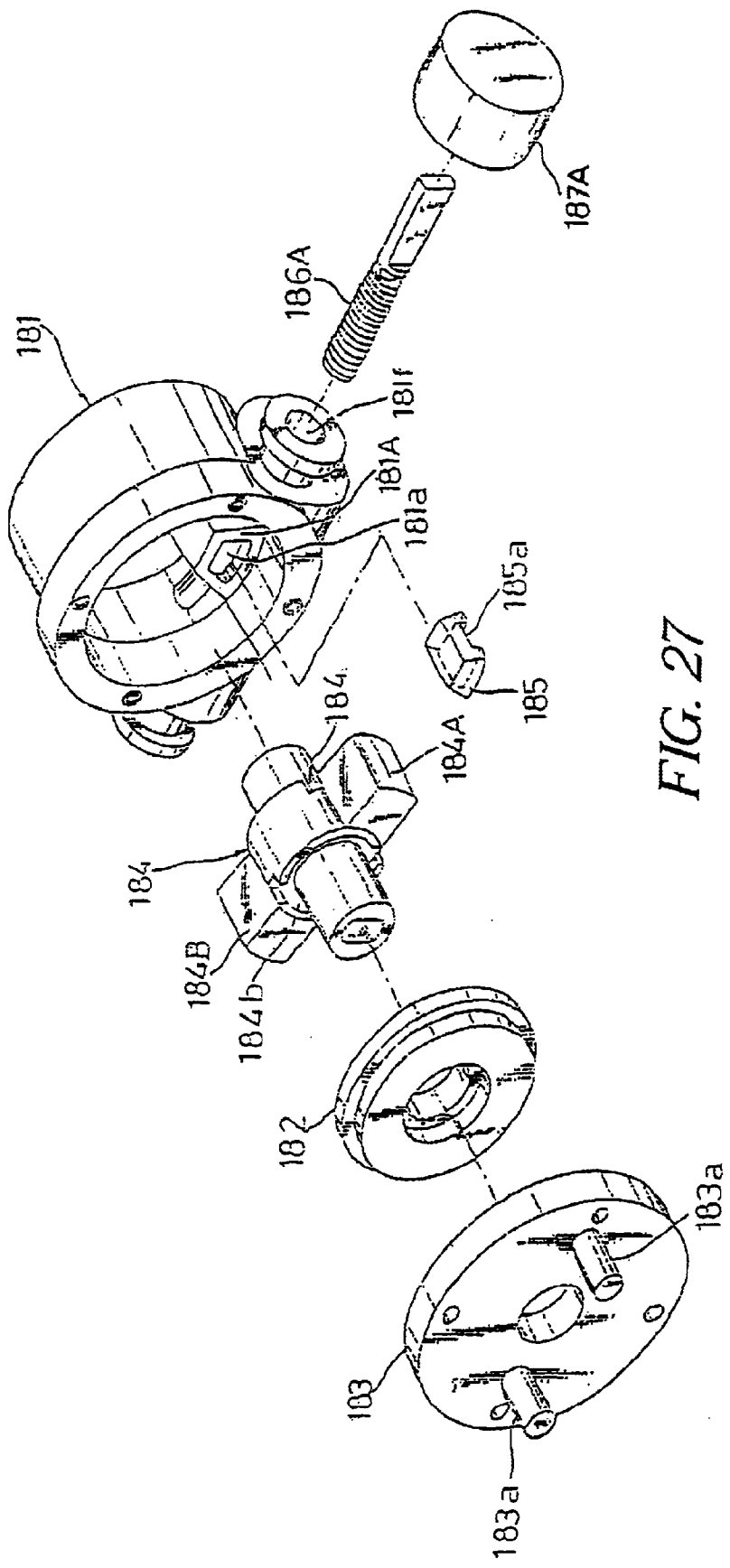
FIG. 27 is an exploded perspective view of the above-mentioned damper.

As shown in FIGS. 18 and 27, a lid body 183 is fixed to an end face of the main body 181 on an opening side thereof. Two fixture protrusions 183a are formed on an end face of the lid body 183 facing the receiving sleeve 123 side. Each fixture protrusion 183a pierces through the front turning link 133 and is engaged with a hole 126a formed in the bottom plate 126. By this, the main body 181 is non-turnably connected to the receiving sleeve 123.

Two slits 133a extending in a circumferential direction are formed in the front turning link 133. A fixture protrusion 183a is inserted in each slit 133a such that the protrusion 183a can move in the circumferential direction. Accordingly, the front turning link 133 is turnable with respect to the main body 181 and the receiving sleeve 123. The turning range of the front turning link 133 is within a range in which the fixture protrusion 183a is abutted with one end part of the slit 133a and thereafter the fixture protrusion 183a is abutted with the other end part. When the fixture protrusion 183a is abutted with one end part of the slit 133a, the seat 140 reaches the working position, and when the fixture protrusion 183a is abutted with the other end part of the slit 133a, the seat 140 reaches the relaxing position.

A rotor 184 is rotatably inserted in the main body 181. One end part of the connecting shaft 137 is non-turnably connected to this rotor 184. Accordingly, when the front turning link 133 is turned in accordance with the tilting motion of the seat 140, the rotor 184 is turned following the turning motion of the front turning link 133.

Figure 25:
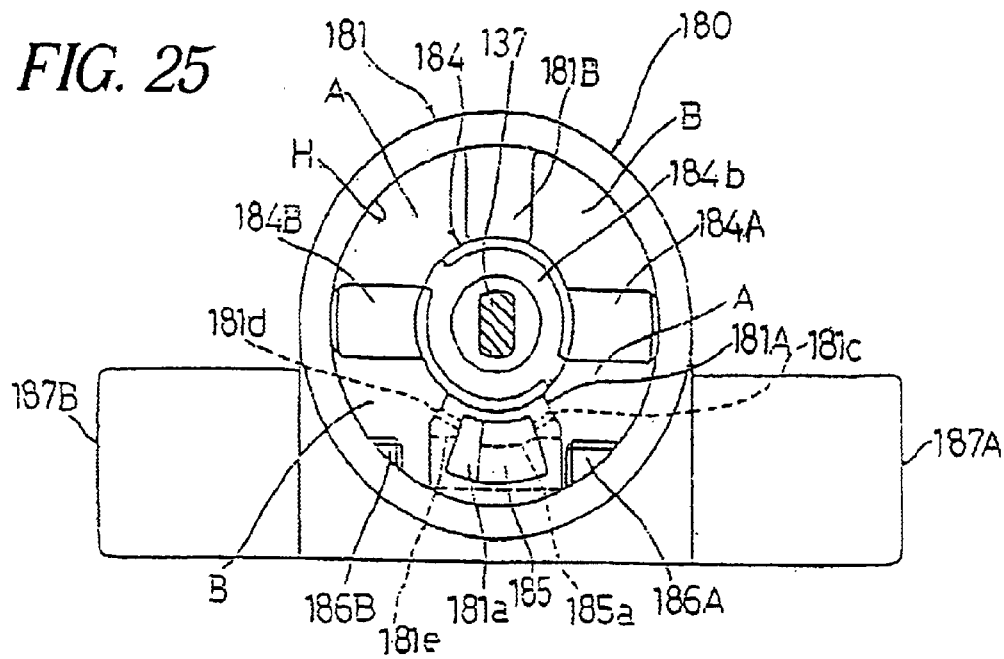
FIG. 25 is a partly omitted front view of a rotary damper used in the above-mentioned embodiment and also of a rotary damper according to a first embodiment of a third form of the present invention.
Figure 26:
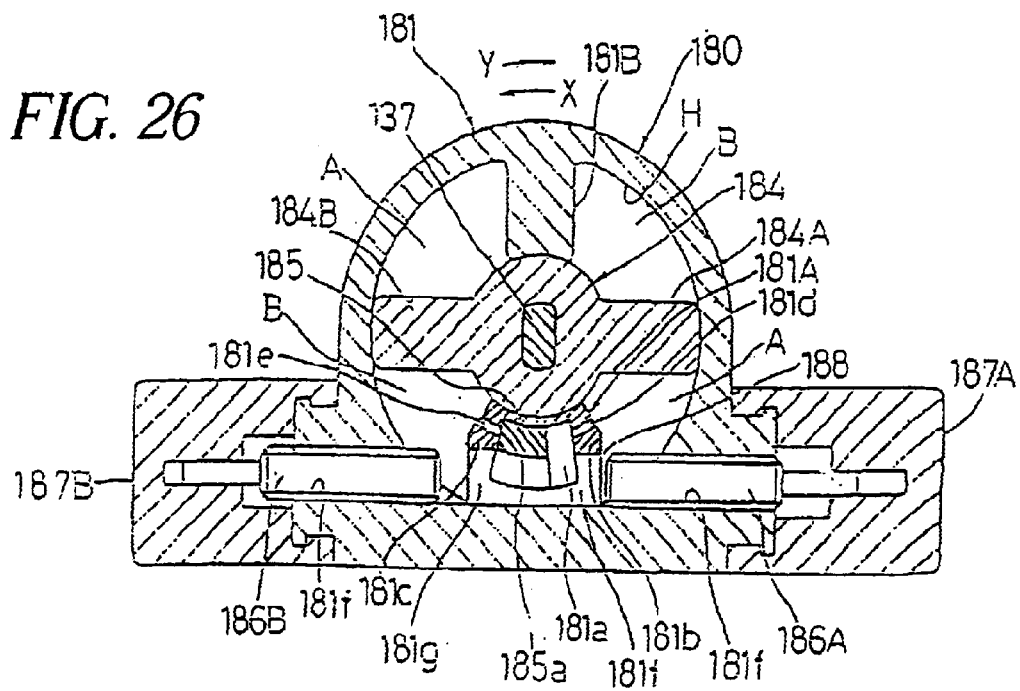
FIG. 26 is a front sectional view of the rotary damper of the above-mentioned embodiment.

As shown in FIGS. 25 and 26, two partition wall parts 181A, 181B are formed on an inner peripheral surface of the receiving hole H of the main body 181 in such a manner as to be away by 180 degrees from each other in the circumferential direction. An end face on an inner periphery side of each partition wall parts, 181A, 181B is relatively turnably slide-contacted with an outer peripheral surface of the rotor 184. Instead of the two partition wall parts 181A, 181B, only one partition wall part may be formed. Two wing parts (partition wall parts) 184A, 184B are formed on the outer peripheral surface of the rotor 184 in such a manner as to be away by 180 degrees from each other in the circumferential direction. With respect to those wing parts 184A, 184B, in the case where only one partition wall part is formed, only one wing part is formed in corresponding thereto. Each of the wing parts 184A, 184B is arranged between adjacent two partition wall parts 181A, 181B. Moreover, outer peripheral surfaces of the wing parts 184A, 184B are turnably contacted with the inner peripheral surface of the main body 181. As a result, the annular space formed between the inner peripheral surface of the main body 181 and the outer peripheral surface of the rotor 184 is divided into four pressure chambers. Two pressure chambers A, A out of four located on diagonal lines are communicated with each other through a communication path 184b (see FIGS. 25 and 27) formed in one end face of the rotor 184, and the remaining two pressure chambers B, B are communicated with each other through a communication path 184c (see FIG. 27) formed in the other end face of the rotor 184.

Of the two partition wall parts 181A, 181B, the partition wall part 181A has a receiving space 181a formed in a central area thereof. By forming this receiving space 181a, fixed wall parts 181b, 181c are formed on opposite end parts in the circumferential direction of the partition wall part 181A. A first flow-in hole (first flow-in path) 181d for communicating the pressure chamber A adjacent to the fixed wall part 181b with the receiving space 181a almost without any resistance is formed in the fixed wall part 181b. A second flow-in hole (second flow-in path) 181e for communicating the pressure chamber B adjacent to the other fixed wall part 181c with the receiving space 181a almost without any resistance is formed in the fixed wall part 181c.

A movable member (movable wall part) 185 is disposed within the receiving space 181a. This movable member 185 can move in the circumferential direction. When the movable member 185 is abutted with the fixed wall part 181b, the first flow-in hole 181d is closed and the second flow-in hole 181e is open. On the contrary, when the movable member 185 is abutted with the other fixed wall part 181c, the second flow-in hole 181e is closed and the first flow-in hole 181d is open. Accordingly, only excluding the occasion where the movable member 185 is moved in the circumferential direction, the receiving space 181a is never communicated with the two pressure chambers A, B at the same time but the receiving space 181a is communicated with only one of the pressure chambers A, B.

That area of the partition wall part 181A which is located lower than the first flow-in hole 181d is formed with a first communication hole 181f. The first communication hole 181f is extended from the pressure chamber A towards the interior of the partition wall part 181A and communicated with the receiving space 181a. That area of the partition wall part 181A which is located lower than the second flow-in hole 181e is formed with a second communication hole 181g. This second communication hole 181g is extended from the pressure chamber B towards the interior of the partition wall part 181A. The second communication hole 181g is not only communicated with the receiving space 181a but also with the first communication hole 181f at the central area of the partition wall part 181A. Accordingly, the pressure chambers A, B are communicated with each other through the first and second communication holes 181f, 181g. Moreover, the first and second communication holes 181f, 181g have the same inside diameter and their axes are aligned to each other. Accordingly, in the case where the first and second communication holes 181f, 181g are subjected to boring treatment, both of them can be bored in a single process.

A groove 185a is formed in an outer peripheral side part of the movable member 185 such that the groove 185a traverses the outer peripheral side part in the circumferential direction. This groove 185a is adapted to enable the fluid to flow almost without any resistance by obtaining a sufficient flow path area of the first and second communication holes 181f, 181g. Accordingly, in the case where a sufficient flow path area can be obtained without a provision of the groove 185a, the groove 185a is not necessary.

Screw holes 181h, 181h extending from the outer surface to the inner surface of the main body 181 are formed in one and the other side parts of the main body 181 which are faced with the first and second communication holes 181f, 181g, respectively. Each of the screw holes 181h has generally the same inside diameter as the first and second communication holes 181f, 181g and they are coaxially arranged. An adjustment screw 186A is threadingly engaged with one of the screw holes 181h, 181h and an adjustment screw 186B is threadingly engaged with the other screw hole 181h. An outer end part of each adjustment screw 186A, 186B projects outside the main body 181. The outer end parts of the adjustment screws 186A, 186B are non-turnably but axially movably connected to handles 187A, 187B which are disposed at opposite side parts of the main body 181 such that the handles 187A, 187B can turn but cannot move. Accordingly, when the handle 187A (187B) is turned, the adjustment screw 186A (186B) is moved forward and backward and brought towards and away from the first communication hole 181*f* (second communication hole 181*g*). When the adjustment screw 186A (186B) is brought towards the first communication hole 181*f* (second communication hole 181*g*), an annular gap (resisting part) 188 is formed between an opening edge part of the first communication hole 181*f* (second communication hole 181*g*) and a forward end outer peripheral edge part of the adjustment screw 186A (adjustment screw 186B) (FIG. 26 shows only the gap 188 formed between the adjustment screw 186A and the first communication hole 181*f*). When a width (interval between an opening end of the first communication hole 181*f* (second communication hole 181*g*) and a forward end face of the adjustment screw 186A (adjustment screw 186B)) of the annular gap 188 is reduced, the annular gap 188 functions as an orifice or the like with respect to the fluid.

In the state as shown in FIG. 26, when the seat 140 is tilted from the working position side to the relaxing position side and the rotor 184 is turned in a direction as indicated by an arrow X of FIG. 26, the fluid in the pressure chamber B is flowed into the receiving space 181*a* via the second flow-in hole 181*e* and the second communication hole 181*g*. Then, a movable valve body 185 is moved in the direction as indicated by the arrow X and abutted with the fixed wall part 181*b*, thereby shielding the first flow-in hole 181*d* (see FIG. 25). As a result, the fluid in the receiving space 181*a* and the second communication hole 181*g* tends to flow into the pressure chamber A through the annular gap 188 formed between the first communication hole 181*f* and the adjustment screw 186A. Since the gap 188 functions as an orifice, the free flow of the fluid is restricted. As a result, the high speed turning of the rotor 184 in the direction as indicated by the arrow X is restricted, and hence the tilting of the seat 140 and the seatback 150 to the relaxing position side is restricted to a low speed. As apparent from this, in this case, the first communication hole 181*f* and the gap 118 constitute the first communication path.

On the other hand, when the seat 140 is tilted from the relaxing position side to the working position side, the rotor 184 is tilted in the direction as indicated by the arrow Y. Then, the fluid in the pressure chamber A flows into the receiving space 181*a* via the first flow-in hole 181*d*. By this, the movable valve body 185 is moved in the same direction to block the second flow-in hole 181*e*. Accordingly, the fluid flowed into the pressure chamber A via the first flow-in hole 181*d* flows into the pressure chamber B via the second communication hole 181*g*. Since the adjustment screw 186B is greatly away from the second communication hole 181*g*, the fluid in the receiving space 181*a* is flowed into the pressure chamber B via the second communication hole 181*g* without any resistance. Accordingly, the rotor 184 can turn in the direction as indicated by the arrow Y at a high speed. Thus, the seat 140 can tilt to the working position side at a high speed. As apparent from this, in this case, the second communication hole 181*g* itself serves as the second communication path.

On the contrary, if the adjustment screw, 186A is brought greatly away from the first communication hole 181*f* and the adjustment screw 186B is brought closer towards the second communication hole 181*g* to form an annular gap 188 therebetween, it becomes possible to allow the high speed tilting of the seat 140 from the working position side to the relaxing position side and to restrict the high speed tilting of the seat 140 from the relaxing position side to the working position side. Accordingly, in this case, the first communication hole 181*f* itself constitutes the first communication path, and the second communication hole 181*g* and the gap 188 constitute the second communication path.

If both the adjustment screws 186A, 186B are brought closer to the first and second communication holes 181*f*, 181*g* and the annular gaps 188 are formed therebetween, respectively, the high speed tilting of the seat 140 can be restricted at the time of tilting in both directions between the relaxing position and the working position. Moreover, the degree of restriction of the high speed tilting can be adjusted by properly adjusting the intervals between the adjustment screws 186A, 186B and the first and second communication holes 181*f*, 181*g*. In this case, the first communication hole 181*f* and the gap 188 constitute the first communication path, and the second communication path and the gap 188 constitute the second communication path.

In the chair 100 with a backseat thus constructed, since the high speed tilting of the seat 140 can be restricted by the rotary damper 180, it becomes possible to restrict the high speed tilting of the seat 140 and the seatback 150 from the working position side to the relaxing position side, or to restrict the high speed tilting from the relaxing position side to the working position side against the user's will. Accordingly, comfortability as a chair with a seatback can be enhanced.

It should be noted that in the above embodiment, although the forward end part 162*a* of the other end part of the coiled spring 160 also serves as the support arm of the seatback 150, the support arm may be provided separately.

Figure 28:
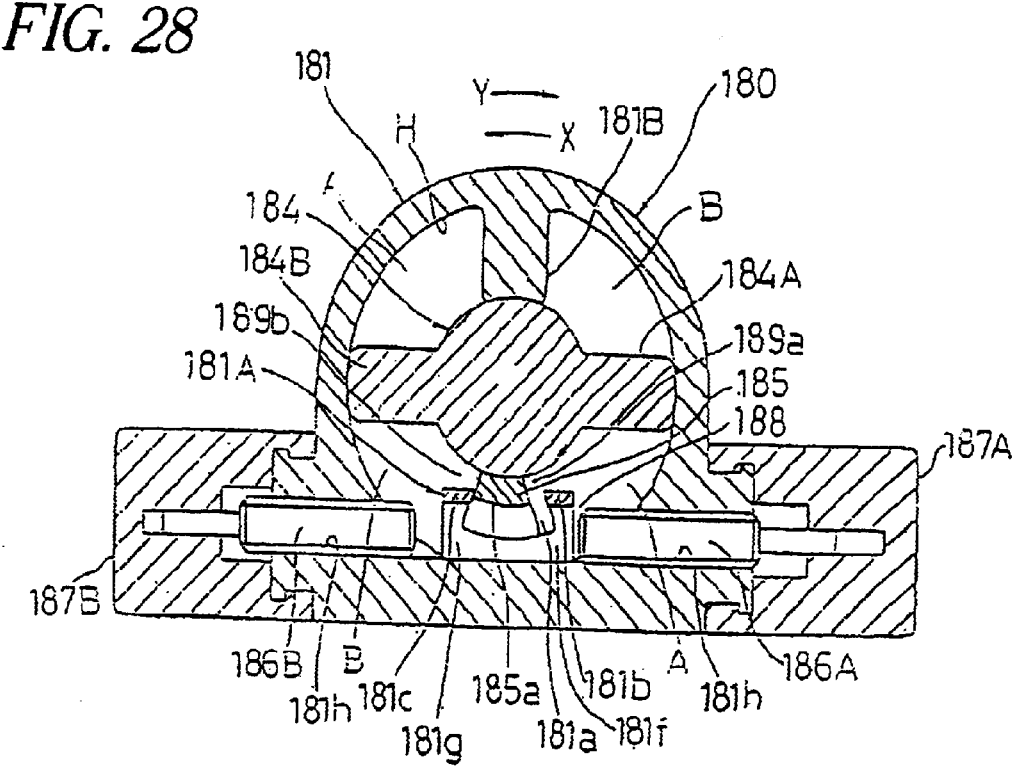
FIG. 28 is a front sectional view showing a second embodiment of the third form of the present invention.
Figure 29:
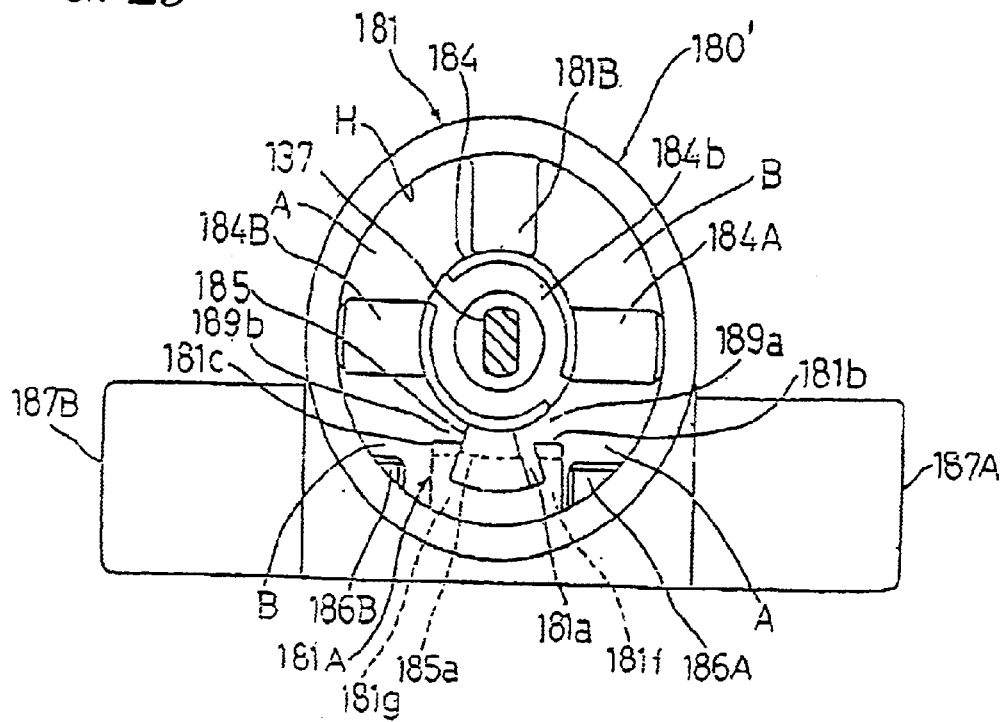
FIG. 29 is a front view showing, partly omitted, a part of the above-mentioned embodiment.

FIGS. 28 and 29 show a second embodiment of a rotary damper of a third form of the present invention. A rotary damper 180' of this embodiment has flow-in gaps (first and second flow-in paths) 189*a*, 189*b* instead of the first and second flow-in holes 181*d*, 181*e* of the above-mentioned embodiment. The flow-in gaps 189*a*, 189*b* are formed between a partition wall part 181A and a rotor 184. That is to say, that surface of the partition wall 181A on the inner peripheral side is away from an outer periphery of the rotor 184, and a receiving space 181*a* as a groove extending in a circumferential direction is formed in its central area. A first and a second flow-in gap 189*a*, 189*b* are formed between that surfaces of left and right fixed wall parts 181*b*, 181*c* on the inner peripheral side and an outer peripheral surface of the rotor 184.

A movable member 185 is circumferentially movably inserted in the receiving space 181*a*. An outer surface of this movable member 185 is circumferentially turnably slide contacted with a bottom surface of the receiving space 181*a*, and an inner surface thereof is turnably slide contacted with the outer peripheral surface of the rotor 184. Accordingly, as shown in FIG. 28, when the movable member 185 is in abutment with a fixed wall part 181*c*, the second flow-in gap 189*b* is blocked but the first flow-in gap 189*a* is open and the pressure chamber A is communicated with the receiving space 181*a* through the first flow-in gap 189*a*. As a result, the pressure chamber A is communicated with the pressure chamber B through the first flow-in gap 189*a*, the receiving space 181*a* and the second communication hole 181*g*. On the contrary, when the movable member 185 is abutted with the fixed wall part 181*b*, the first flow-in gap 189*a* is blocked but the second flow-in gap 189b is open and the pressure chamber B is communicated with the receiving space 181a through the second flow-in gap 189b. As a result, the pressure chamber B is communicated with the pressure chamber A through the second flow-in gap 189b, the receiving space 181a, the first communication hole 181f and the gap 188. The remaining construction is the same as the rotary damper 180 of the above-mentioned embodiments.

In the rotary damper 180' thus constructed, suppose that the rotor 184 is turned in a direction as indicated by an arrow Y and as a result, as shown in FIG. 28, the movable member 185 is abutted with the fixed wall part 181c. In this state, the fluid in the pressure chamber A is flowed into the pressure chamber B through the first flow-in gap 189a, the receiving space 181a and the second communication hole 181g without any resistance. Accordingly, the rotor 184 can be rotated in the direction as indicated by the arrow Y at a high speed. Thus, the seat 140 can be tilted from the relaxing position side to the working position side at a high speed. On the contrary, when the rotor 184 is turned in the direction as indicated by the arrow X, the movable member 185 is abutted with the fixed wall part 181b. In this state, the fluid in the pressure chamber B is flowed into the first communication hole 181f through the second flow-in gap 189b and the receiving space 181a and also flowed into the first communication hole 181f through the second communication hole 181g. The fluid flowed into the first communication hole 181f from the pressure chamber B tends to flow into the pressure chamber A through the gap 188. At this time, since the gap 188 functions as an orifice, the free flow of the fluid is restricted. As a result, the high speed turning of the rotor 184 in the direction as indicated by the arrow X is restricted and hence, the tilting of the seat 140 from the working position side to the relaxing position side is restricted to a low speed. Of course, as in the case with the rotary damper 180, by revering the positional relation between the adjustment screw 186A and the first communication hole 181f, and the adjustment screw 186B and the second communication hole 181g, it becomes possible that the seat 140 is tilted to the relaxing position side at a high speed and the seat 140 is tilted to the working position side at a low speed. It is also possible that the seat 140 is tilted at a low speed in both directions between the relaxing position and the working position.

Figure 30:
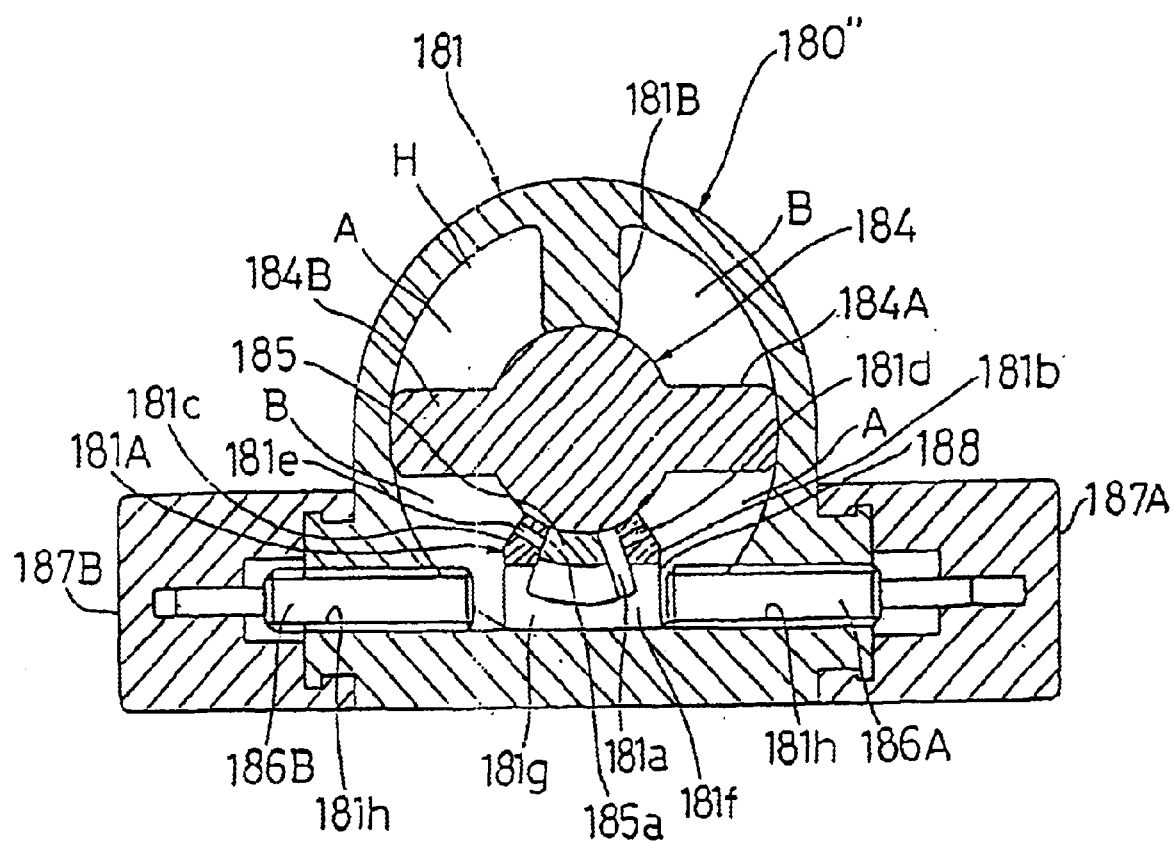
FIG. 30 is a front sectional view showing a third embodiment of the third form of the present invention.

FIG. 30 shows a third embodiment of a rotary damper according to a third form of the present invention. A rotary damper 180" of this embodiment is constructed such that an inner peripheral side of a receiving space 181a is open and a movable member 185 is turnably slide contacted with an outer peripheral surface of a rotor 184. The remaining constitution is the same as the above-mentioned rotary damper 180.

It should be noted that the rotary damper according to the present invention is not limited to the above embodiments but that changes can be made in accordance with necessity.

For example, in the above embodiments, although the partition wall part 181A is divided into the fixed wall parts 181b, 181c and the movable member (movable wall part) 185, it is also accepted that the other partition wall part 181B or the wing parts (partition wall parts) 184A, 184B of the rotor 184 are divided into the fixed wall parts and the movable wall part.

Moreover, although the axes of the adjustment members 186A, 186B are aligned with the axes of the first and second communication holes 181f, 181g, they are not necessarily required to be aligned.

Furthermore, although the gap 188 is formed as a resistor part or orifice by bringing the adjustment members 186A, 186B closer to the first and second communication holes 181f, 181g, the resistor part may be formed at the first and second communication holes 181f, 181g.

Industrial Applicability

A chair with a seatback according to the present invention can be used as an office-use chair, a home-use chair and a chair for use of other purposes. A rotary damper according to the present invention can be used in the chair with a seatback according to the present invention and in other chairs in which the rotation must be controlled to a low speed.

What is claimed is:

1. A chair with a seatback comprising a main frame (3), a seat frame (41) arranged at an upper side of said main frame (3), a seatback frame (51) whose forward end part is connected by a connecting portion (61) to a forward end part of said main frame (3) such that the forward end part can turn about a horizontal axis, thereby enabling a rear end part of said seatback frame (51) to be tilted between a working position and a relaxing position, a displacement mechanism disposed between the rear end part of said seat frame (41) and said seatback frame (51) and adapted to displace the rear end part of said seat frame (41) in an obliquely forward/backward direction in accordance with the turning motion of said seatback frame (51), and a positive motion cam mechanism (70) for displacing said seat frame (41) upward and downward, forward and backward and for tilting said seat frame (41) upward and downward in cooperation with said displacement mechanism, wherein said positive motion cam mechanism (70) is disposed between the forward end part of said seat frame (41) and the forward end part of said seatback frame (51), and said positive motion cam mechanism (70) is arranged at a rear of the connecting portion (61) at which the seatback frame (51) is turnably connected to the main frame (3).

2. A chair with a seatback according to claim 1, wherein said positive motion cam mechanism (70) includes a cam hole (71) and a shaft (72) movably inserted in said cam hole (71) in a longitudinal direction of said cam hole (71), one of said cam hole (71) and said shaft (72) is disposed at said seat frame (41) and the other is disposed at said seatback frame (51).

3. A chair with a seatback according to claim 2, wherein said cam hole (71) is disposed at said seatback frame (51).

4. A chair with a seatback according to claim 1, wherein a tower end part of a shielding member (92) is disposed at a forward end part of said main frame (3) such that said shielding member (92) can turn about a horizontal axis, said shielding member is adapted to shield a gap formed between a forward end part of said main frame (3) and said seat frame (41) or a seat cushion (42) disposed at said seat frame (41), and an upper part of said shielding plate (92) is connected to a forward end part of said seat frame (41) such that when said gap varies in size in accordance with the displacement of said seat frame (41), said shielding plate (92) is turned in accordance with the size of the gap.

5. A chair with a seatback, comprising a main frame (3), a seat frame (41) arranged at an upper side of said main frame (3), a seatback frame (51) whose forward end part is connected to a forward end part of said main frame (3) such that the forward end part can turn about a horizontal axis, thereby enabling a rear end part of said seatback frame (51) to be tilted between a working position and a relaxing position, a displacement mechanism disposed between the rear end part of said seat frame (41) and said seatback frame (51) and adapted to displace the rear end part of said seat frame (41) in an obliquely forward/backward direction in accordance with the turning motion of said seatback frame (51), and a positive motion cam mechanism (70) for displacing said seat frame (41) upward and downward, forward and backward and for tilting said seat frame (41) upward and downward in cooperation with said displacement mechanism, wherein said positive motion cam mechanism (70) is disposed between the forward end part of said seat frame (41) and the forward end part of said seatback frame (51), and wherein said displacement mechanism includes a link (63) connected at a lower end part thereof to said main frame (3) such that said link (63) can turn about a horizontal axis and at an upper end part thereof to a rear end part of said seat frame (41) such that said link (63) can turn about a horizontal axis, a second positive motion cam mechanism (65) disposed between an upper end part of said link (63) and said seatback frame (51) and adapted to cause said link (63) to turn in accordance with the turning motion of said seatback frame (51), and said second positive motion cam mechanism (65) includes a second cam hole (66) and a second shaft (67), said second cam hole (66) being disposed at one of an upper end part of said seatback frame (51) and said link (63), said second shaft (67) being disposed at the remaining one of the upper end part of said seatback frame (51) and said link (63) and movably inserted in said second cam hole (66).

6. A chair with a seatback according to claim 5, wherein said main frame (3) is provided with an engagement member (90) removably engaged with said link (63) and adapted to positionally fix said seatback frame (51) to the working position by prohibiting the turning of said link (63) at the time of engagement.

7. A chair with a seatback comprising a main frame (120), a seat (149) supported by said main frame (120), and a seatback (150) arranged at a location higher than a rear part of said seat (140) and supported by said main frame (120) through a support arm (162), wherein a pair of said support arms (162) are disposed one at a left and the other at a right, and said pair of support arms (162, 162) are elastically deformable so that when a user twisted his body with his back pressed against said seatback (150), said seatback (150) can turn in a horizontal direction following the twisting motion of the user's body, and wherein said seat (140) is tiltably supported by said main frame (120) for tilting between a working position and a relaxing position through a tilting mechanism (130), a pair of return springs (160, 160) are disposed between said main frame (120) and said seat (140) and adapted to bias said seat (140) from the relaxing position side to the working position side, and end parts of said pair of return springs (160, 160) for biasing said seat (140) from the relaxing position side to the working position side serve also as said support arms (162, 162).

8. A chair with a seatback according to claim 7, wherein said tilting mechanism (130) includes two pairs of front and rear turning links (133, 133; 131, 131) whose lower end parts are supported by said main frame (120) such that the lower end parts can turn about a horizontal axis extending leftward and rightward and whose upper end parts are connected to said seat (140) such that the upper end parts can turn about a horizontal axis extending leftward and rightward, a coiled spring is used as said return spring (160), and a pair of said coiled springs (160, 160) are arranged in a row between said pair of front turning links (133, 133).

9. A chair with a seatback according to claim 8, wherein said main frame (120) is provided with a rotary damper (180) for restricting a high speed turning of at least one of said two pairs of turning links (133, 133; 131, 131).

10. A chair with a seatback according to claim 8, wherein said main frame (120) is provided with an adjusting mechanism (170) for adjusting biasing force of said coiled springs (160, 160) in accordance with turning operation of said adjustment member (175), and an adjustment member (175) for operating said adjustment mechanism (170) is disposed at a front end part of said main frame (120) and at a front part of a generally central area of said pair of front turning links (133, 133).

* * * * *

UNITED STATES PATENT AND TRADEMARK OFFICE
CERTIFICATE OF CORRECTION

PATENT NO.    : 6,705,677 B2
DATED         : March 16, 2004
INVENTOR(S)   : Oshima et al.

It is certified that error appears in the above-identified patent and that said Letters Patent is hereby corrected as shown below:

Column 20,
Line 50, change the word "tower" to the word -- lower --

Signed and Sealed this

Sixth Day of July, 2004

JON W. DUDAS
*Acting Director of the United States Patent and Trademark Office*